United States Patent
Nishino

(10) Patent No.: US 7,843,788 B2
(45) Date of Patent: Nov. 30, 2010

(54) OPTICAL RECORDING MEDIUM DRIVING DEVICE AND SPHERICAL ABERRATION ADJUSTMENT METHOD

(75) Inventor: Masatoshi Nishino, Chiba (JP)

(73) Assignee: Sony NEC Optiarc Inc., Tokyo (JP)

(*) Notice: Subject to any disclaimer, the term of this patent is extended or adjusted under 35 U.S.C. 154(b) by 587 days.

(21) Appl. No.: 11/856,407

(22) Filed: Sep. 17, 2007

(65) Prior Publication Data

US 2008/0074973 A1  Mar. 27, 2008

(30) Foreign Application Priority Data

Sep. 26, 2006  (JP) ............................. 2006-260297

(51) Int. Cl.
*G11B 20/18* (2006.01)
(52) U.S. Cl. .................................. 369/53.35
(58) Field of Classification Search ............... None
See application file for complete search history.

(56) References Cited

U.S. PATENT DOCUMENTS

| | | | |
|---|---|---|---|
| 2001/0033541 A1* | 10/2001 | Iwasaki et al. | 369/112.02 |
| 2001/0053163 A1* | 12/2001 | Furukawa | 372/24 |
| 2003/0107961 A1* | 6/2003 | Yasuda et al. | 369/44.27 |
| 2003/0202437 A1* | 10/2003 | Yamada et al. | 369/44.29 |
| 2004/0151088 A1* | 8/2004 | Kuze et al. | 369/44.32 |
| 2006/0062098 A1* | 3/2006 | Miyake et al. | 369/44.11 |
| 2006/0098540 A1* | 5/2006 | Ando | 369/44.41 |
| 2006/0164949 A1* | 7/2006 | Sagara et al. | 369/106 |
| 2007/0064552 A1* | 3/2007 | Kurokawa et al. | 369/44.23 |
| 2007/0159951 A1* | 7/2007 | Sagara | 369/106 |

FOREIGN PATENT DOCUMENTS

| | | |
|---|---|---|
| JP | 2003-132558 | 5/2003 |
| JP | 2004-95106 | 3/2004 |

OTHER PUBLICATIONS

U.S. Appl. No. 11/849,520, filed Sep. 4, 2007, Nishino.

* cited by examiner

*Primary Examiner*—Hoa T Nguyen
*Assistant Examiner*—Mark L Fischer
(74) *Attorney, Agent, or Firm*—Oblon, Spivak, McClelland, Maier & Neustadt, L.L.P.

(57) ABSTRACT

An optical recording medium driving device includes an optical head, an evaluation signal generating section, a focus servo section, a spherical aberration correction section, a focus bias adjuster, and a system controller. The optical head has a focus servo mechanism and a spherical aberration correction mechanism, irradiates a laser light, and detects a reflected light. The evaluation signal generating section generates, based on the reflected light, an evaluation signal. The focus servo section drives the focus servo mechanism according to a focus error signal to perform focus servo. The spherical aberration correction section drives the spherical aberration correction mechanism to perform spherical aberration correction. The focus bias adjuster adds focus bias to a focus loop. The system controller performs an operation for setting an adjustment spherical aberration correction value.

6 Claims, 12 Drawing Sheets

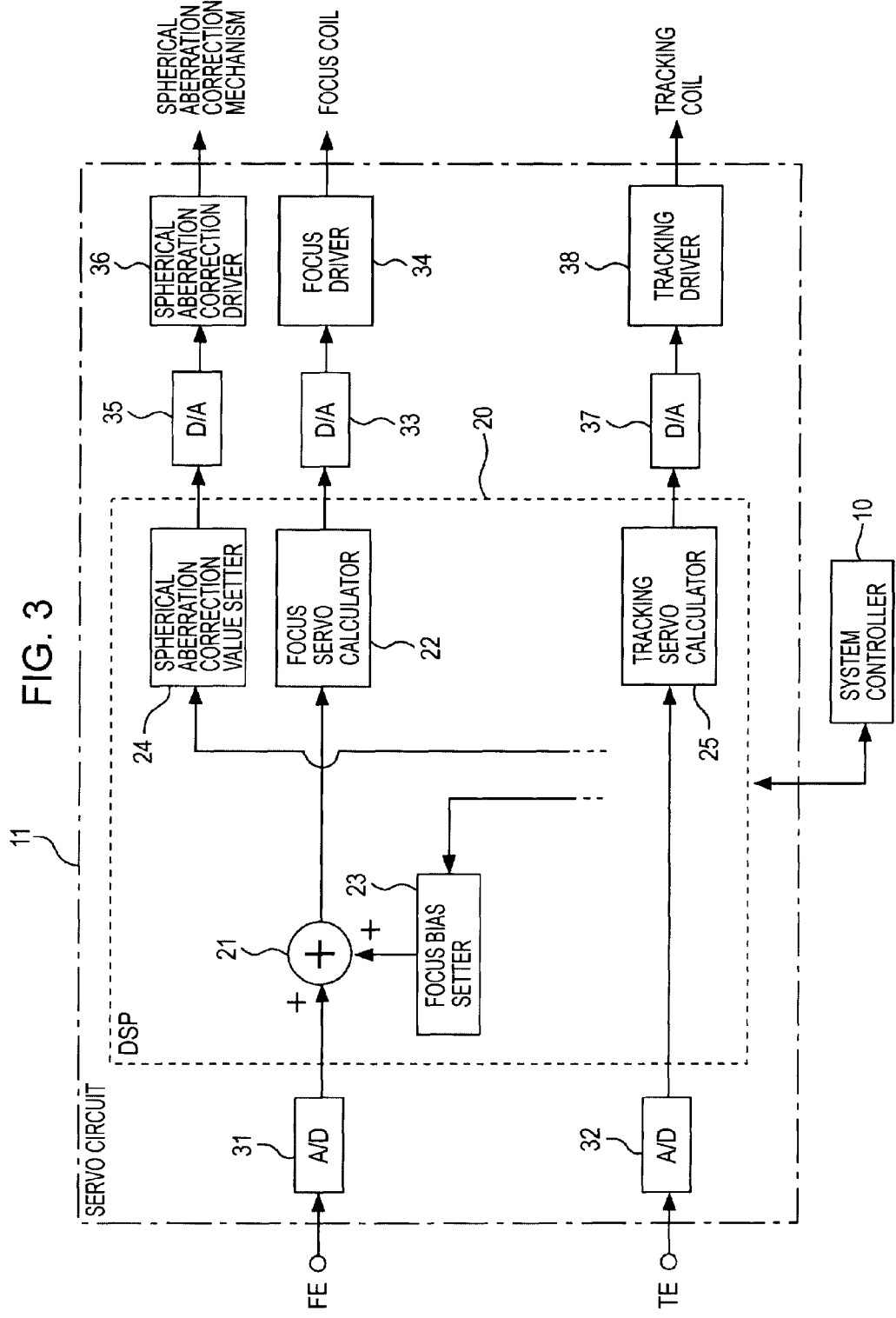

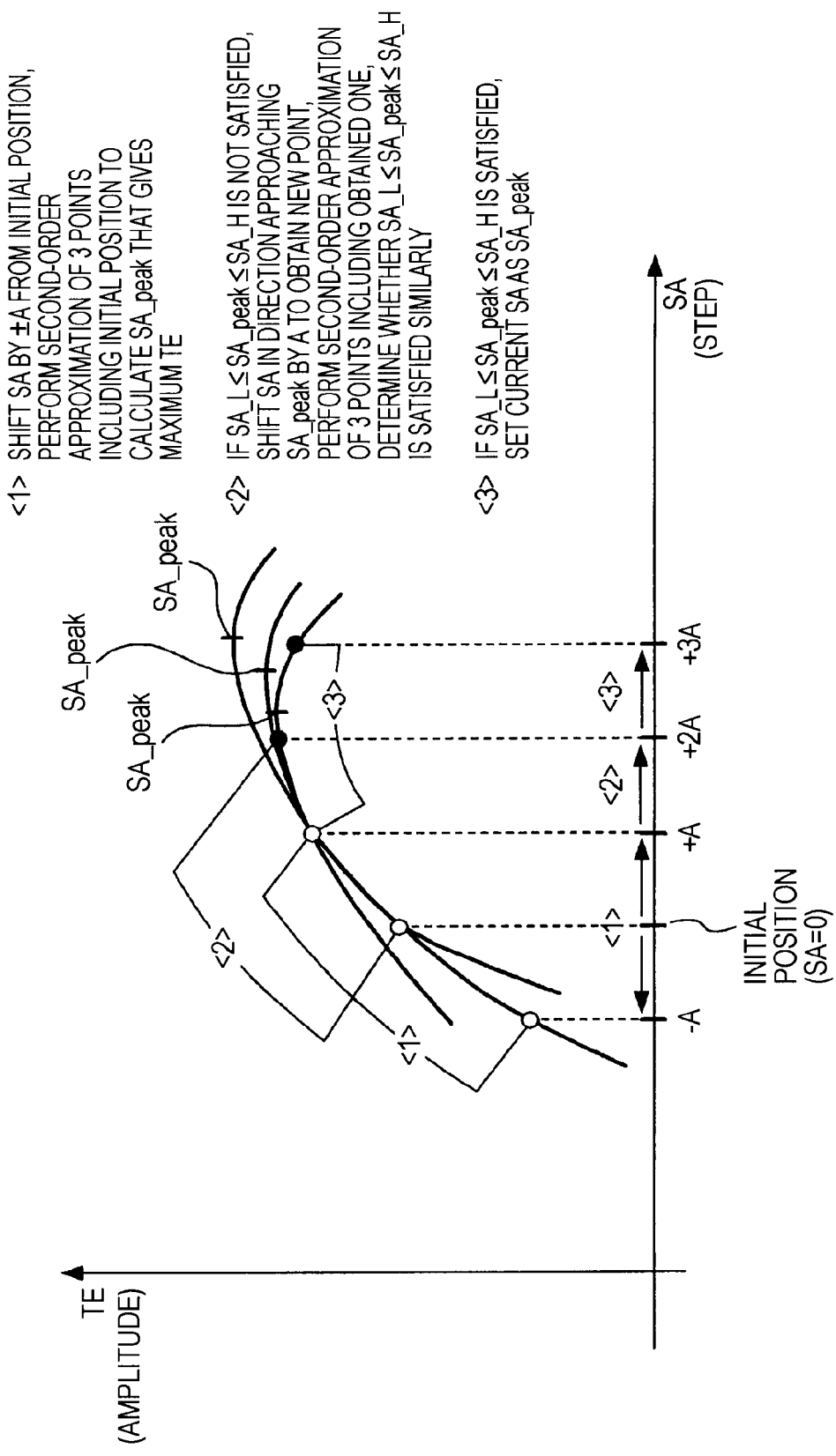

○ IF CONVEX-UPWARD CURVE IS OBTAINED AS A RESULT,
  EXECUTE OPERATION BASED ON DETERMINATION OF SA_L   SA_peak   SA_H

○ IF NOT, REPEAT OPERATION UNTIL CONVEX-UPWARD CURVE IS OBTAINED

OPTICAL RECORDING MEDIUM DRIVING DEVICE AND SPHERICAL ABERRATION ADJUSTMENT METHOD

CROSS REFERENCES TO RELATED APPLICATIONS

The present invention contains subject matter related to Japanese Patent Application JP 2006-260297 filed in the Japanese Patent Office on Sep. 26, 2006, the entire contents of which are incorporated herein by reference.

BACKGROUND OF THE INVENTION

1. Field of the Invention

The present invention relates to optical recording medium driving devices, particularly, those for performing coarse adjustment of a spherical aberration correction value to enable tracking servo, and to spherical aberration adjustment methods.

2. Description of the Related Art

Data recording techniques that employ optical disc recording media (including magneto-optical discs), such as, for example, a compact disc (CD), a mini disc (MD), and a digital versatile disc (DVD), as recording media are known as techniques for recording and reproducing digital data. The optical disc recording media (also simply referred to as optical discs) is a general term referring to disc recording media on which signals are recorded as pits and marks and onto which laser light is irradiated to read the signals through changes in the reflected light.

Types of optical discs include playback-only types, such as, for example, a CD, a CD-ROM (read only memory), and a DVD-ROM, and user-data-recordable types, such as an MD, a CD-R (recordable), a CD-RW (rewritable), a DVD-R, a DVD-RW, DVD+RW, and a DVD-RAM. For the recordable types, a magneto-optical recording method, a phase change recording method, a dye film change recording method, and other recording methods are utilized to record data. The dye film change recording method, also referred to as a write-once recording method, allows data recording only once and does not allow rewriting. The dye film change recording method is therefore suitable for data storing purposes and the like. On the other hand, the magneto-optical recording method and the phase change recording method permit data rewriting, thereby finding many applications in recording of various contents including music, videos, games, and application programs.

Furthermore, recently developed high-density optical discs, called Blu-ray Discs®, offer an extremely high data storage capacity.

Regarding a structure of the discs, high-density optical discs, such as Blu-ray Discs, have a cover layer of approximately 0.1 mm in thickness of the discs. Data is reproduced from (or recorded on) the discs using a combination of a laser having a wavelength of 405 nm (so-called a blue laser) and an objective lens having numerical aperture (NA) of 0.85.

As is known, recording/reproducing apparatuses that record and reproduce data on optical discs perform a focus servo operation for controlling a focal position of a laser light onto a recording surface of discs, and a tracking servo operation for controlling the laser light to trace a track (a pit string or a groove) on discs.

It is known that an appropriate focus servo operation needs adding appropriate focus bias on a focus loop.

In particular, high-density optical discs require spherical aberration correction in order to cope with variations in the thickness of a cover layer and multiple recording layers. For example, an optical pickup including a spherical aberration correction mechanism employing an expander or a liquid crystal device has been developed.

Since recording/reproducing apparatuses, such as Blu-ray Disc recording/reproducing apparatuses, employing a high NA lens have a narrow margin for the focus bias and the spherical aberration, automatic adjustment of the focus bias and the spherical aberration is essential.

A spherical aberration correction value and focus bias are adjusted using some kind of evaluation value as an evaluation indicator. For example, a jitter value obtained in response to altering both the spherical aberration correction value and the focus bias can be employed as the evaluation value. The spherical aberration correction value and the focus bias are adjusted to minimize the jitter value.

For example, a case where a jitter value is used as an evaluation value at the time of adjustment assumes a state in which tracking servo can operate and the jitter value can be measured.

However, particularly regarding the spherical aberration correction value, the spherical aberration may deteriorate so much that the tracking servo does not operate when altering the spherical aberration correction value during adjustment in the above-described manner, which thus may prevent the appropriate adjustment operation from being performed.

Accordingly, prior to adjustment of a spherical aberration correction value and focus bias, the spherical aberration correction value is coarsely adjusted first in the related art.

More specifically, an amplitude value of a tracking error signal is obtained in response to altering a spherical aberration correction value with only focus servo being turned on, and the spherical aberration correction value is adjusted so that the amplitude value does not below a predetermined level. That is, the spherical aberration correction value is adjusted only as suitable as the tracking servo can operate.

By coarsely adjusting the spherical aberration correction value, the above-described fine adjustment of the spherical aberration correction value and the focus bias can be performed appropriately thereafter on the basis of the jitter value.

Japanese Unexamined Patent Application Publication No. 2004-95106 is an example of the related art.

SUMMARY OF THE INVENTION

However, a coarsely adjusted spherical aberration correction value is not necessarily suitable for reproduction jitter.

This will be described with reference to FIGS. 11A and 11B and FIGS. 12A and 12B.

FIG. 11A illustrates a position of a spherical aberration correction value coarsely adjusted on the basis of an amplitude value of a tracking error signal on a property map (contours) of the tracking error signal amplitude value with respect to changes in the spherical aberration correction value and focus bias. FIG. 11B illustrates the position of the spherical aberration correction value on a property map (contours) of a jitter value with respect to changes in the spherical aberration correction value and the focus bias.

The axis direction of the property of the tracking error signal amplitude (illustrated as a chain line in the figure) illustrated in FIG. 11A substantially agrees with the axis direction of the property of the jitter value illustrated in FIG. 11B. In such a case, the spherical aberration correction value coarsely adjusted on the basis of the amplitude value of the tracking error signal is relatively preferable on the property of the jitter value. Thus, fine adjustment of the spherical aberration correction value and the focus bias can be performed appropriately after the coarse adjustment.

On the contrary, FIGS. 12A and 12B illustrate a case where the above-described the axis directions of the properties differ significantly. FIG. 12A illustrates a position of a spherical aberration correction value coarsely adjusted on the basis of an amplitude value of a tracking error signal on a property map (contours) of the amplitude value of the tracking error signal with respect to changes in the spherical aberration correction value and focus bias. FIG. 12B illustrates the position of the spherical aberration correction value on a property map (contours) of a jitter value.

As the comparison of FIGS. 12A and 12B indicates, in a case where the axis directions of the property of the tracking error signal amplitude value and the property of the jitter values differ, the position of the spherical aberration correction value coarsely adjusted on the basis of the amplitude value of the tracking error signal may not be preferable on the property of the jitter value.

As a result, the coarse adjustment may unable data reproduction to be performed and addresses to be detected, or unable the correction value to be adjusted to an optimum value because the jitter value at the start of fine adjustment is too bad. That is, the coarse adjustment may unable the fine adjustment to be performed.

Recently, driving devices compatible with media, such as a CD, a DVD, and a Blu-ray Disc, that use a laser light having different wavelengths with a common optical pickup have been developed. However, as illustrated in FIGS. 12A and 12B, pickups, particularly those compatible with such three wavelengths, may have different axis directions due to design constraints, a countermeasure for which is desired.

Accordingly, an optical recording medium driving device according to an embodiment of the present invention is configured in the following manner in view of the above-described disadvantages.

More specifically, the optical recording medium driving device includes head means, evaluation signal generating means, focus servo means, spherical aberration correction means, focus bias means, and control means.

The head means irradiates a laser light onto an optical recording medium and detects a reflected light to read out a signal, and has a focus servo mechanism and a spherical aberration correction mechanism for the laser light.

The evaluation signal generating means generates an evaluation signal that serves an indicator of evaluating the quality of the readout signal on the basis of the reflected light detected by the head means.

The focus servo means drives the focus servo mechanism according to a focus error signal generated on the basis of the reflected light detected by the head means to perform a focus servo operation.

In addition, the spherical aberration correction means drives the spherical aberration correction mechanism according to the spherical aberration correction value to perform a spherical aberration correction operation. The focus bias means adds focus bias to a focus loop including the focus servo means.

Additionally, the control means performs an operation for fixing an adjustment value of the spherical aberration correction value. The control means fixes a first adjustment value of the spherical aberration correction value on the basis of a value of the evaluation signal obtained in response to altering the spherical aberration correction value with the focus servo being performed by the focus servo means and on a limit value set for the spherical aberration correction value.

As described above, the predetermined limit value set for the spherical aberration correction value is provided in the coarse adjustment of the spherical aberration correction value that is performed with only the focus servo being turned on. This can advantageously prevent a position of the coarsely adjusted spherical aberration correction value on the property of the evaluation signal from worsening even in a case where axes of the property of an amplitude value of a tracking error signal (a value of the evaluation signal) and the property of a jitter value (an evaluation value serving as an indicator of the quality of a reproduced signal at the time of fine adjustment performed after the coarse adjustment) differ, unlike the case in the related art where the spherical aberration correction value is adjusted to a value that optimizes the value of the evaluation signal, for example.

Accordingly, embodiments of the present invention can advantageously prevent a position of the coarsely adjusted spherical aberration correction value on the property of the evaluation signal from worsening even in a case where axes of the property of a value of an evaluation signal and the property of an evaluation value serving as an indicator of the quality of a reproduced signal at the time of fine adjustment performed after the coarse adjustment differ.

As a result, in a case where the directions of the axes of the properties differ as described above, it is possible to lower likelihood that data reproduction and address detection may not be performed depending on the setting of the coarsely adjusted spherical aberration correction value, and to perform the fine adjustment when the axis directions differ significantly. That is, it is possible to expand a fine adjustment executable range with respect to the difference in the axis directions.

In addition, as a factor worsening the position of the coarsely adjusted spherical aberration correction value on the property of the evaluation value, it is considered that initial positions of the spherical aberration correction value and the focus bias set at the time of start of the coarse adjustment deviate from the positions (optimum values) of the spherical aberration correction value and the focus bias to be narrowed during the fine adjustment performed.

To take this into account, the embodiments of the present invention that prevent the position of the spherical aberration correction value from worsening on the property of the evaluation value used during the fine adjustment in the above-described manner can expand a fine adjustment performable range with respect to unsuitable initial positions.

BRIEF DESCRIPTION OF THE DRAWINGS

FIG. 3 is a block diagram illustrating an internal configuration of a servo circuit included in a recording/reproducing apparatus according to an embodiment of the present invention;

FIG. 4 describes a basic coarse adjustment operation employed in an embodiment of the present invention;

DESCRIPTION OF THE PREFERRED EMBODIMENTS

Preferred embodiments (hereinafter, referred to as embodiments) for carrying out the present invention will be described below. The description will be given in the following order.

1. Configuration of optical recording medium driving device
2. Coarse adjustment operation of spherical aberration correction value according to embodiments
3. Processing operation for realizing coarse adjustment operation 1. Configuration of Optical Recording Medium Driving Device FIG. 1 is a block diagram illustrating an internal configuration of a recording/reproducing apparatus serving as an optical recording medium driving device according to one embodiment of the present invention.

Figure 1:
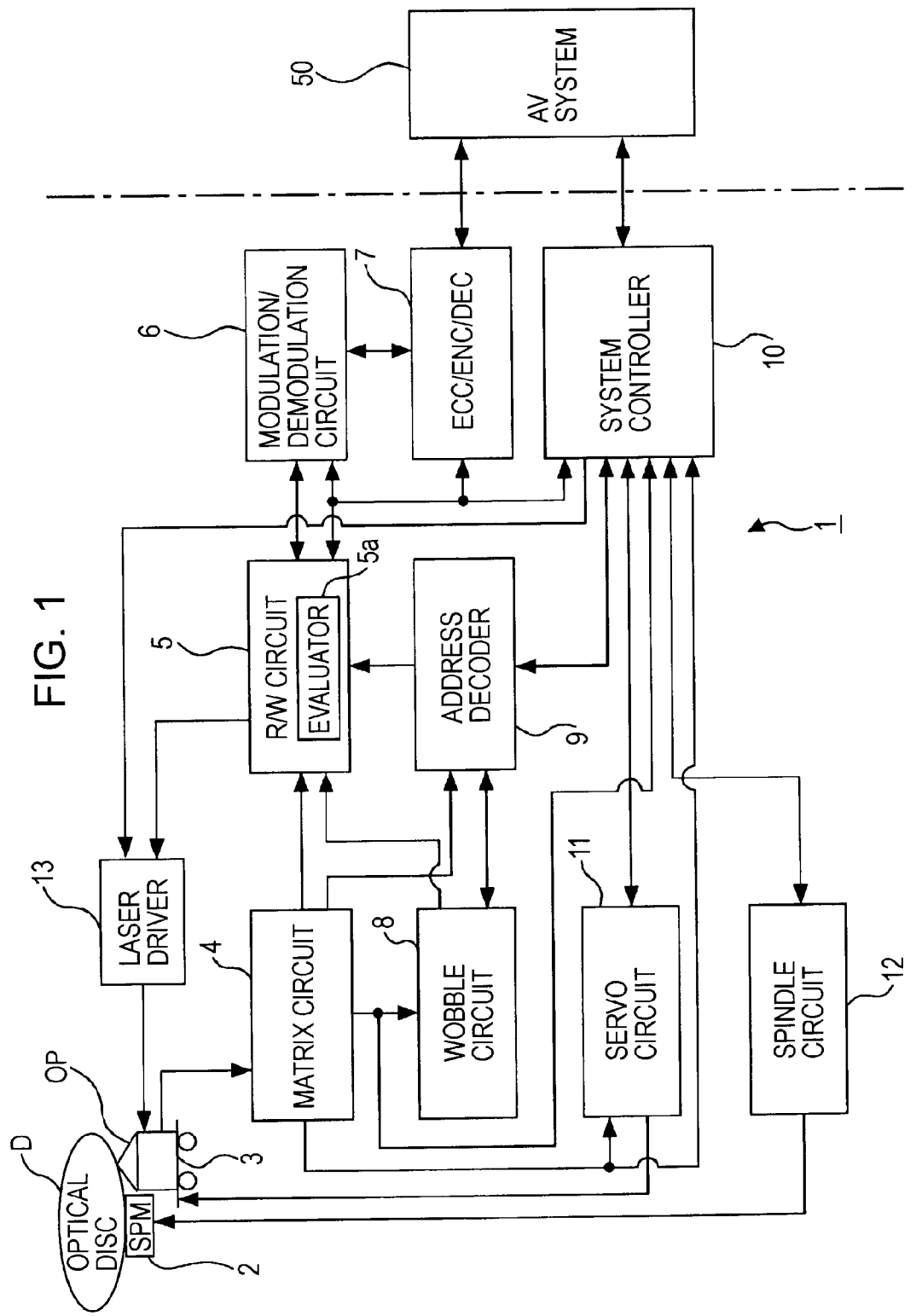
FIG. 1 is a block diagram illustrating an internal configuration of a recording/reproducing apparatus according to an embodiment of the present invention.

Referring to FIG. 1, an optical disc D is an optical disc recording medium (hereinafter, also referred to as a writable disc) for storing data recorded thereon using a phase change recording method, for example. A wobbling groove is formed on the disc D, and serves as a recording track. Address information, namely, so-called address in pre-groove (ADIP) information, may be embedded in the wobbling groove.

The optical disc D is mounted on a turn table (not shown), and is rotationally driven at a constant linear velocity (CLV) by a spindle motor 2 during recording and reproducing operations.

An optical pickup (optical head) OP reads the ADIP information embedded as the wobble of a groove track on the optical disc D.

During the recording operation, the optical pickup OP records user data as a phase change mark on a track. During the reproducing operation, the optical pickup OP reads the recorded phase change mark.

The optical pickup OP includes a laser diode serving as a laser light source, a photodetector detecting a reflected laser light, an objective lens serving as an output terminal of a laser light, and an optical system (to be discussed later) for irradiating a laser light on a recording surface of the optical disc D through the objective lens, and for guiding the reflected light to the photodetector.

In the optical pickup OP, the objective lens is held by a two-axis mechanism so as to be movable in a tracking direction and in a focus direction.

The optical pickup OP is movable in a radial direction of the optical disc D by a sled mechanism 3.

Additionally, the laser diode included in the optical pickup OP is driven by a drive signal (drive current) supplied from a laser driver 13 to emit a laser light.

As will be discussed later, the optical pickup OP includes a mechanism for correcting a spherical aberration of the laser light. The spherical aberration correction mechanism performs spherical aberration correction under the control of a system controller 10 and a servo circuit 11.

The light reflected from the optical disc D is detected, is converted into an electrical signal corresponding to an amount of the received light, and is supplied to a matrix circuit 4 by the photodetector.

The matrix circuit 4 includes a current-voltage converter circuit and a matrix calculation and amplification circuit that operate in response to currents output from a plurality of light receiving elements serving as the photodetectors. The matrix circuit 4 performs a matrix calculation processing, thereby generating necessary signals.

For example, the matrix circuit 4 generates a high-frequency signal corresponding to reproduced data (also referred to as a reproduced data signal or an RF signal), a focus error signal FE and a tracking error signal TE that are used for servo control.

The matrix circuit 4 further generates a signal related to wobbling of the groove, namely, a push-pull signal for detecting a wobble (wobble amplitude).

The reproduced data signal output from the matrix circuit 4 is supplied to a reader/writer (RW) circuit 5. The focus error signal FE and the tracking error signal TE are supplied to the servo circuit 11. The push-pull signal is supplied to a wobble circuit 8.

In addition, particularly in this embodiment, the tracking error signal TE is also supplied to the system controller 10 so as to be used as an evaluation indicator during coarse adjustment of spherical aberration correction value, which will be discussed later.

The reader/writer circuit 5 performs binarization processing and reproduction clock generation processing on the reproduced data signal (RF signal) using a phase-lock loop (PLL), thereby reproducing data read as a phase change mark. The reader/writer circuit 5 then supplies the reproduced data to a modulation/demodulation circuit 6.

In addition, in this embodiment, the reader/writer circuit 5 includes an evaluator 5a for measuring a jitter value of the RF signal. The jitter value measured by the evaluator 5a is supplied to the system controller 10.

The modulation/demodulation circuit 6 has a portion functioning as a decoder during a reproducing operation and a portion functioning as an encoder during a recording operation.

The modulation/demodulation circuit 6 thus performs run-length limited decoding processing on the basis of a reproduction clock during the reproducing operation.

An ECC encoder/decoder 7 performs ECC encoding processing for attaching an error correction code during the recording operation and ECC decoding processing for correcting errors during the reproducing operation.

During the reproducing operation, the ECC encoder/decoder 7 captures data decoded by the modulation/demodulation circuit 6 to an internal memory, and performs error detection/correction processing and deinterleave processing on the data to obtain reproduced data.

The data reproduced by the ECC encoder/decoder 7 is read out and transferred to an audio-visual (AV) system 50 on the basis of instructions of the system controller 10.

The push-pull signal output from the matrix circuit 4 as the signal related to the wobble of the groove is processed by the wobble circuit 8. The wobble circuit 8 demodulates the push-pull signal serving as the ADIP information into a data stream representing the ADIP address. The data stream is then supplied to an address decoder 9.

The address decoder 9 decodes the supplied data to obtain an address value, and supplies the address value to the system controller 10.

The address decoder 9 also generates a clock through PLL processing using a wobble signal supplied from the wobble circuit 8, and then supplies the clock to each part as an encoding clock for recording, for example.

During the recording operation, recording data is transferred from the AV system 50 to a memory (not shown) in the ECC encoder/decoder 7 for buffering.

In this case, the ECC encoder/decoder 7 performs encoding processing on the buffered recording data, thereby attaching an error correction code, interleaving, and attaching subcode to the buffered recording data.

The modulation/demodulation circuit 6 performs a predetermined run-length limited encoding processing (modulation processing), such as, for example, RLL (1-7) PP method, on the ECC encoded data, and then supplies the encoded data to the reader/writer circuit 5.

During the recording operation, the clock generated from the wobble signal as described above is used for the encoding clock serving as a reference clock for the encoding processing.

The reader/writer circuit 5 performs a recording compensating processing on the recording data generated in the encoding processing. More specifically, the reader/writer circuit 5 performs fine adjustment of an optimum recording power and adjustment of a laser drive pulse waveform in consideration of characteristics of a recording layer, a spot shape of a laser light, a recording linear velocity, etc. The reader/writer circuit 5 then supplies the adjusted recording data to the laser driver 13 as a laser drive pulse.

The laser driver 13 supplies the fed laser drive pulse to a laser diode included in the optical pickup OP, thereby driving the optical pickup OP to emit the laser light. Pits (phase change marks) corresponding to the recording data are thus formed on the optical disc D.

The laser driver 13, including an auto power control (APC) circuit, controls the laser power to a constant level regardless of a temperature change while monitoring the laser output power using an output from a detector for monitoring the laser output power provided in the optical pickup OP.

The system controller 10 gives the laser driver 13 a target value of the laser output power during the recording and reproducing operations (recording laser power and reproducing laser power). During the recording and reproducing operations, the laser driver 13 controls the laser output power levels so that the levels are at the target levels.

The servo circuit 11 generates various of servo drive signals, such as a focus servo drive signal, a tracking servo drive signal, and a sled servo drive signal, from the focus error signal FE and the tracking error signal TE supplied from the matrix circuit 4.

More specifically, the servo circuit 11 generates the focus drive signal and the tracking drive signal corresponding to the focus error signal FE and the tracking error signal TE, respectively, thereby driving a focus coil and a tracking coil in a two-axis mechanism included in the optical pickup OP. Each of a tracking servo loop and a focus servo loop is thus constituted by the optical pickup OP, the matrix circuit 4, the servo circuit 11, and the two-axis mechanism.

In response to a track jump command supplied from the system controller 10, the servo circuit 11 turns off the tracking servo loop and outputs a jump drive signal, thereby performing a track jump operation.

The servo circuit 11 also generates a sled drive signal on the basis of a sled error signal obtained as a low-frequency component of the tracking error signal TE and access control of the system controller 10, thereby driving the sled mechanism 3. The sled mechanism 3 includes a main shaft supporting the optical pickup OP, a sled motor, transmission gears, etc (not shown). The sled mechanism 3 drives the sled motor according to the sled drive signal, thereby sliding the optical pickup OP.

A spindle servo circuit 12 controls a spindle motor 2 to rotate at a CLV.

The spindle servo circuit 12 acquires, as current rotation speed information of the spindle motor 2, a clock generated in the PLL processing performed on the wobble signal, and compares this rotation speed information with predetermined CLV reference speed information, thereby generating a spindle error signal.

During the data reproduction, a reproduction clock generated by the PLL in the reader/writer circuit 5 (clock serving as a reference in the decoding processing) corresponds to the current rotation speed information of the spindle motor 2. The spindle error signal can also be generated by comparing the reproduction clock with the predetermined CLV reference speed information.

The spindle servo circuit 12 outputs a spindle drive signal generated according to the spindle error signal, thereby causing the spindle motor 2 to rotate at the CLV.

The spindle servo circuit 12 generates the spindle drive signals in response to spindle kick/brake control signals supplied from the system controller 10, thereby causing the spindle motor 2 to start, stop, accelerate, and decelerate.

The above-described operations of the servo system and the recording and playback system are controlled by the system controller 10 including a microcomputer.

The system controller 10 performs various operations according to commands supplied from the AV system 50. For example, in response to a write command from the AV system 50, the system controller 10 moves the optical pickup OP to a write address. The ECC encoder/decoder 7 and the modulation/demodulation circuit 6 perform the above-described encoding processing on the data transferred from the AV system 50 (e.g., video data and audio data in various formats, such as MPEG2). The laser drive pulse from the reader/writer circuit 5 is then supplied to the laser driver 13 to record the recording data onto the optical disc D.

When the AV system 50 issues a read command requesting transfer of given data recorded on the optical disc D (for example, video data in MPEG2), the system controller 10 first controls an operation for seeking an instructed address. More specifically, a command is issued to the servo circuit 11 to cause the optical pickup OP to access the address specified by a seek command.

The system controller 10 controls an operation for transferring the data in a specified data interval to the AV system 50. More specifically, data is read from the optical disc D, and a decoding and buffering process is performed on the read data using the reader/writer circuit 5, the modulation/demodulation circuit 6, and the ECC encoder/decoder 7. The requested data is then transferred.

With the phase change mark used during the recording and reproducing operations, the system controller 10 controls access, recording, and reproducing operations using the ADIP address detected by the wobble circuit 8 and the address decoder 9.

As shown in FIG. 1, the recording and reproducing apparatus is connected to the AV system 50. An optical recording medium driving device according to one embodiment of the present invention may be connected to a personal computer.

The optical recording medium driving device is not necessarily connected to another apparatus. In such a case, an operation unit and a display unit are provided and the configuration of data input and output interfaces may differ from the configuration of FIG. 1. More specifically, data input and output terminals are arranged and the recording and reproducing operations may be performed in response to user operations.

Figure 2:
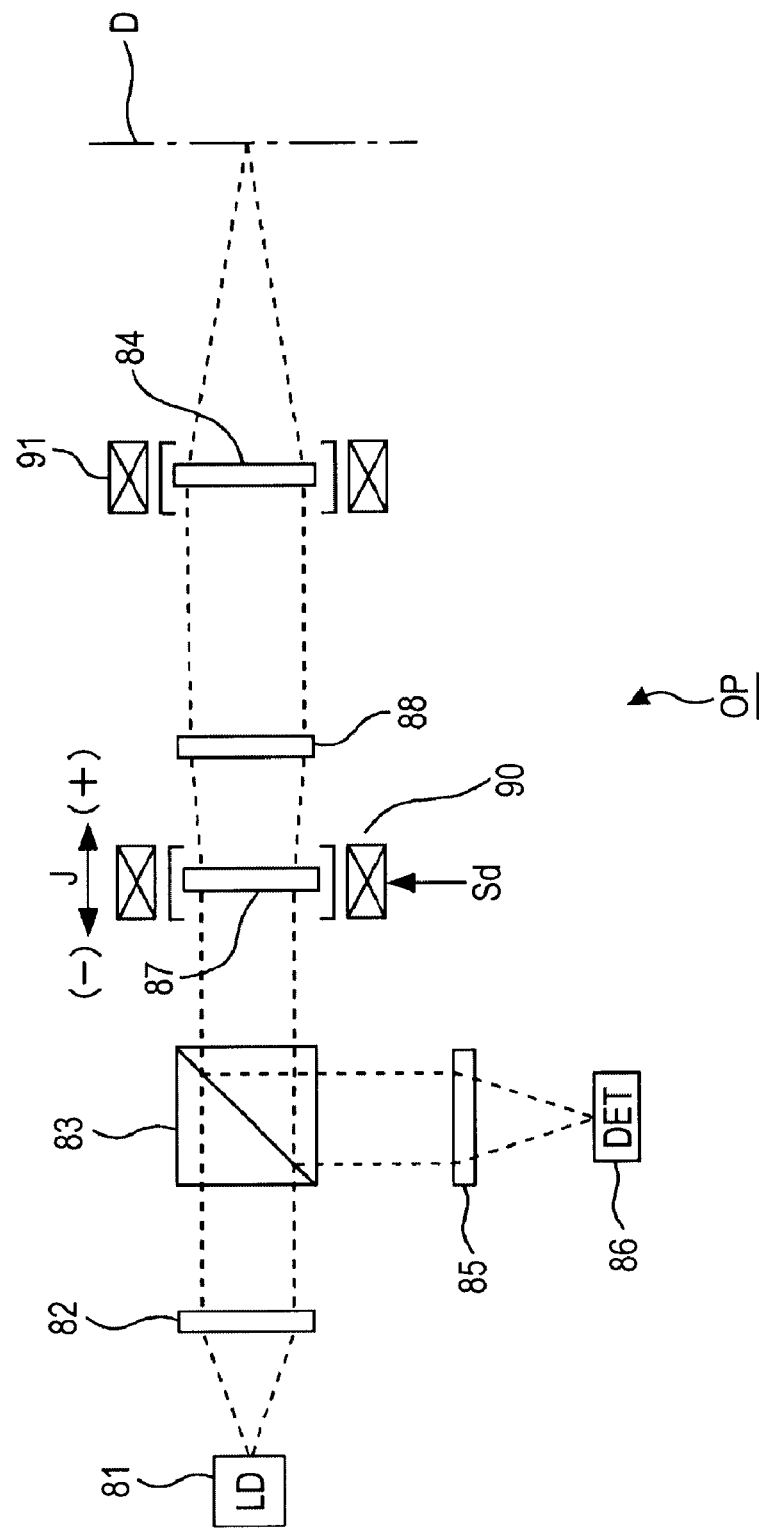
FIG. 2 illustrates a configuration of a spherical aberration correction mechanism included in a recording/reproducing apparatus according to an embodiment of the present invention.

FIG. 2 illustrates an example of a spherical aberration correction mechanism included in the optical pickup OP. More specifically, FIG. 2 mainly illustrates a configuration of an optical system included in the optical pickup OP.

Referring to FIG. 2, a laser light output from a semiconductor laser (laser diode) 81 is collimated by a collimator lens 82. The collimated laser light passes through a beam splitter 83, then passes through a movable lens 87 and a fixed lens 88 of a spherical aberration correction lens group, and then is irradiated onto the optical disc D through an objective lens 84. The spherical aberration correction lens group 87 and 88 are referred to as an expander. Since the spherical aberration correction is performed by driving the movable lens 87, the movable lens 87 may be particularly referred to as an expander 87.

The light reflected from the optical disc D passes through the objective lens 84, the fixed lens 88, and the movable lens 87, and is reflected by the beam splitter 83, and is irradiated onto a detector 86 through a collimator lens (light collecting lens 85).

In the optical system, the objective lens 84 is supported by a two-axis mechanism 91 so as to be movable in a focus direction and in a tracking direction, thereby performing the focus servo operation and the tracking servo operation.

The spherical aberration correction lenses 87 and 88 have a function of defocusing a wavefront of the laser light. More specifically, the movable lens 87 is supported by an actuator 90 so as to be movable in a J direction, which is an optical axis direction. By moving the movable lens 87, an object point of the objective lens 84 is adjusted.

More specifically, the spherical aberration is corrected by controlling the actuator 90 to perform a back and forth movement.

FIG. 2 illustrates a configuration for a case where the spherical aberration correction is performed using the expander. The spherical aberration may also be corrected using a liquid-crystal panel.

A liquid-crystal panel is inserted in an optical path between the semiconductor laser 81 and the objective lens 84. A boundary between an area passing the laser light and an area blocking the laser light is movably adjusted to vary a diameter of a laser light beam, thereby correcting the spherical aberration.

In this case, a liquid-crystal driver for driving the liquid-crystal panel is controlled to vary a light passing area.

FIG. 3 illustrates an internal configuration of the servo circuit 11 shown in FIG. 1.

Referring to FIG. 3, the focus error signal FE and the tracking error signal TE supplied from the matrix circuit 4 shown in FIG. 1 are converted into digital data by analog-to-digital (A/D) converters 31 and 32 included in the servo circuit 11 and then input to a digital signal processor (DSP) 20 included in the servo circuit 11.

The DSP 20 includes a focus servo calculator 22, a tracking servo calculator 25, an adder 21, a focus bias setter 23, and a spherical aberration correction value setter 24, as shown in the drawing.

The focus error signal FE supplied from the A/D converter 31 is input to the focus servo calculator 22 through the adder 21 included in the DSP 20.

The focus servo calculator 22 performs a filtering process and a loop gain process on the focus error signal FE input as digital data for phase correction, thereby generating and outputting a focus servo signal.

The focus servo signal is converted into an analog signal by a digital-to-analog (D/A) converter 33 (including PWM and PDM) and input to a focus driver 34 to drive a focus actuator. More specifically, a current is applied to the focus coil of the two-axis mechanism 91 supporting the objective lens 84 in the optical pickup OP to perform a focus servo operation.

The tracking servo calculator 25 performs a filtering process and a loop gain process on the tracking error signal TE input as digital data for phase correction, thereby generating and outputting a tracking servo signal. The tracking servo signal is converted into an analog signal by a D/A converter 37 (including PWM and PDM), and input to a tracking driver 38 to drive a tracking actuator. More specifically, a current is applied to the tracking coil of the two-axis mechanism 91 supporting the objective lens 84 in the optical pickup OP to perform a tracking servo operation.

The adder 21, the focus bias setter 23, and the spherical aberration correction value setter 24 included in the DSP 20 function as units for performing focus bias addition, spherical aberration correction value setting, and adjustment of the focus bias value and the spherical aberration correction value, respectively.

The adder 21 adds a focus bias to the focus error signal FE. The focus bias value to be added is set by the focus bias setter 23. In an adjustment process to be discussed later, the focus bias setter 23 outputs the focus bias value set by the system controller 10 shown in FIG. 1, thereby adding an appropriate focus bias to the focus bias loop.

The system controller 10 sets a spherical aberration correction value in the spherical aberration correction value setter 24. The set spherical aberration correction value is converted into an analog signal by a D/A converter 35, and then supplied to a spherical aberration correction driver 36.

In the case of the spherical aberration correction mechanism shown in FIG. 2, the spherical aberration correction driver 36 supplies a drive signal Sd to the actuator 90 for moving the expander 87. In the case of the spherical aberration correction mechanism employing the liquid-crystal panel, the spherical aberration correction driver 36 supplies to the liquid-crystal driver a signal Sd instructing a voltage applied to a predetermined cell in the liquid-crystal panel.

The spherical aberration correction driver 36 drives the spherical aberration correction mechanism in the optical pickup OP on the basis of the spherical aberration correction value supplied from the spherical aberration correction value setter 24.

2. Coarse Adjustment Operation of Spherical Aberration Correction Value According to Embodiments Now, in the recording/reproducing apparatus 1, the system controller 10 controls the focus bias setter 23 and the spherical aberration correction value setter 24 included in the above-described DSP 20 to perform an operation for adjusting the focus bias and the spherical aberration correction value to optimum values.

As described before, in related art, during such processing for adjusting the focus bias and the spherical aberration correction value, "coarse adjustment" for adjusting only the spherical aberration correction value is performed using, for example, a value of amplitude of a tracking error signal TE as an evaluation indicator with only focus servo being turned on. After performing the coarse adjustment in this manner, "fine adjustment" for adjusting both the focus bias and the spherical aberration correction value is performed using, for example, a jitter value calculated by the evaluator 5a as an evaluation indicator.

The above-described coarse adjustment is performed because there are cases where tracking servo does not operate when, particularly, a spherical aberration correction value is altered for adjustment as described above. This may prevent an appropriate fine adjustment operation based on the jitter value from being performed.

More specifically, a spherical aberration correction value that gives, for example, an optimum (maximum) value of amplitude of a tracking error signal TE is determined in this coarse adjustment using the value of amplitude of the tracking error signal TE as the evaluation value in the above-described manner. During the fine adjustment performed thereafter, the adjustment operation can be performed on the basis of this determined spherical aberration correction value. This, therefore, prevents a circumstance in which the adjustment operation is not performed appropriately because the tracking servo does not operate from occurring.

However, with a coarse adjustment method in the related art for determining the spherical aberration correction value that gives a maximum value of amplitude of the tracking error signal TE in the above-described manner, for example, the spherical aberration correction value obtained in the coarse adjustment may be unpreferable on the property of the jitter value in a case where directions of axes of the property of the value of the amplitude of the tracking error signal TE and the property of the jitter value differ as shown in comparison in FIGS. 11A and 11B and FIGS. 12A and 12B. As a result, the coarse adjustment may prevent the fine adjustment based on the jitter value from being performed appropriately on the contrary.

Accordingly, to overcome such a disadvantage, coarse adjustment according to an embodiment of the present invention fixes an adjustment value, i.e., a result of the coarse adjustment, on the basis of a value of an evaluation signal (e.g., a value of amplitude of a tracking error signal TE) obtained in response to altering the spherical aberration correction value and on a limit value set for the spherical aberration correction value.

Such a coarse adjustment operation according to the embodiment will be described below.

Basic Coarse Adjustment Operation Employed in Embodiments

Before describing a coarse adjustment operation according to an embodiment of the present invention, a basic coarse adjustment operation employed in the embodiment will be described first with reference to FIG. 4 and FIGS. 5A and 5B.

Figure 5A:
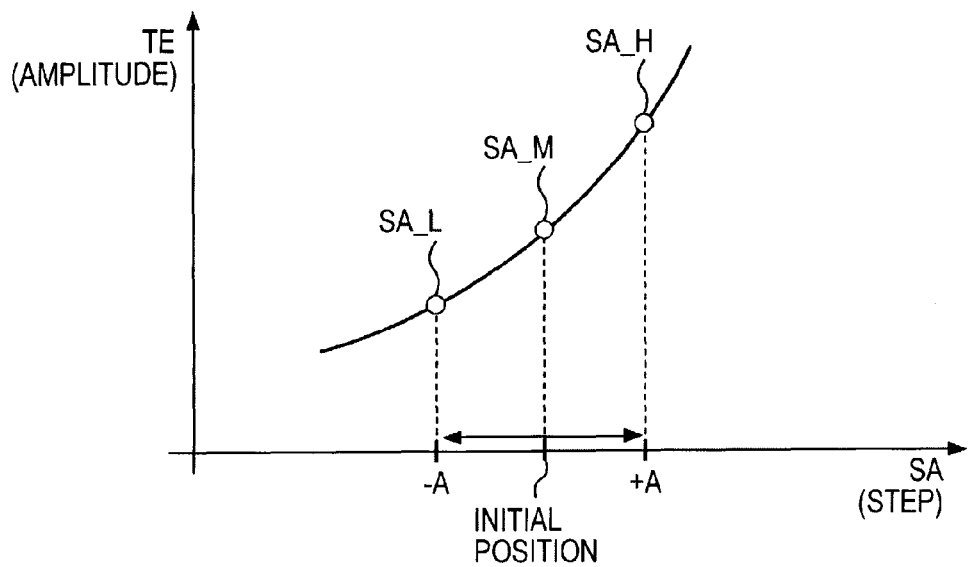
FIGS. 5A and 5B describe a basic coarse adjustment operation employed in an embodiment of the present invention.
Figure 5B:
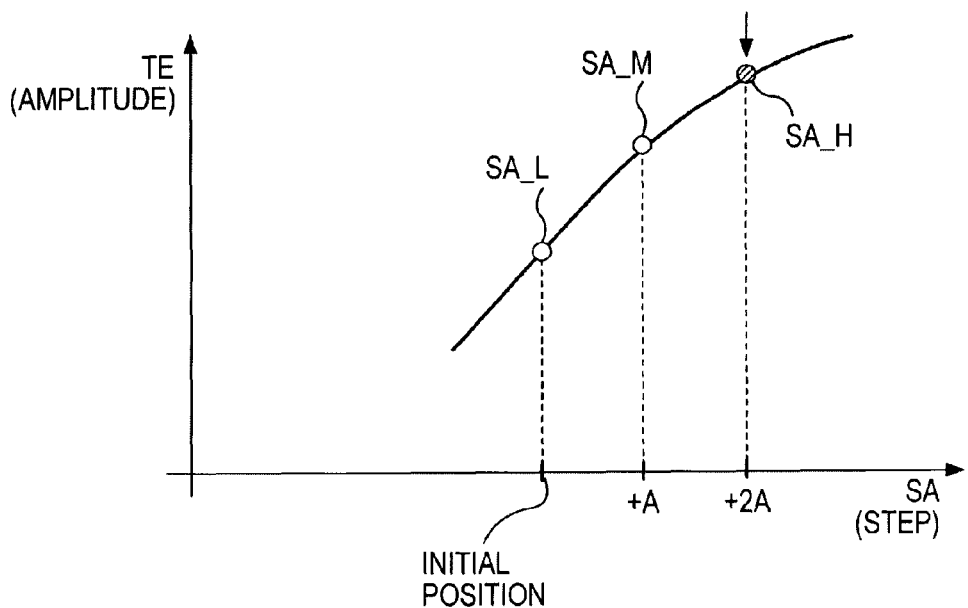

FIG. 4 and FIGS. 5A and 5B schematically illustrate a basic coarse adjustment operation employed in the embodiment on a two-dimensional plane having a horizontal axis representing a spherical aberration correction value (SA) and a vertical axis representing an amplitude value of a tracking error signal TE. In addition, the system controller 10 performs operations described in these drawings.

For confirmation, the coarse adjustment is performed by altering only the spherical aberration correction value and on the basis of a value of an evaluation signal (in this case, the amplitude value of the tracking error signal TE) resulting from the alteration. The focus bias is fixed at, for example, a predetermined initial value (e.g., FB=0). Thus, FIG. 4 and FIGS. 5A and 5B illustrate only two axes of the spherical aberration correction value and the amplitude of the tracking error signal, but omits an axis representing the focus bias.

Firstly, referring to FIG. 4, suppose that only focus servo is turned on at the time of starting of the coarse adjustment. In addition, suppose that the spherical aberration correction value and the focus bias are set at predetermined initial values (e.g., SA=0, FB=0, hereinafter, the initial values are also referred to as initial positions), respectively.

Then, the system controller 10 alters the spherical aberration correction value SA by a alteration step A, and calculates the second-order approximation of three points including the initial position to determine a spherical aberration correction value (SA_peak) that gives a maximum amplitude value (TE) of the tracking error signal TE as shown by <1> in the drawing.

More specifically, under the above-described setting condition of the initial positions of the spherical aberration correction value and the focus bias, the system controller 10 causes the optical pickup OP to read a signal, and obtains an amplitude value of the tracking error signal TE supplied from the matrix circuit 4 in response to the reading, and stores this amplitude value at the initial position. Then, the system controller 10 alters the spherical aberration correction value SA by a predetermined alteration step A in the positive and negative directions with respect to the initial position, similarly obtains an amplitude value of the tracking error signal TE on each of the spherical aberration correction value setting conditions, and stores the amplitude value in association with the set spherical aberration correction value.

Then, the system controller 10 calculates the second-order approximation using the three spherical aberration correction values obtained in this manner and the amplitude values of the tracking error signal TE obtained under the corresponding spherical aberration correction value setting conditions. On the basis of an obtained quadratic curve, the system controller 10 determines a spherical aberration correction value SA_peak that gives the maximum amplitude of the tracking error signal TE.

Hereinafter, three spherical aberration correction values obtained by altering the spherical aberration correction value by the alteration step A in the above-described manner are referred to as "SA_L", "SA_M", and "SA_H" in the ascending order of the correction value. In addition, the amplitude values of the tracking error signal TE obtained under the setting conditions of the three spherical aberration correction values of "SA_L", "SA_M", and "SA_H" are referred to as "TE_L", "TE_M", and "TE_H", respectively.

After determining the value SA_peak by calculating the second-order approximation of the three points obtained by altering the spherical aberration correction value SA by the alteration step A in the positive and negative directions with respect to the initial position, the system controller 10 performs operations shown as <2>. More specifically, if SA_L≦SA_peak≦SA_H is not satisfied, the system controller 10 alters the spherical aberration correction value SA by the alteration step A in a direction approaching the value SA_peak to obtain a new point, calculates the second-order approximation of three points including the newly obtained one, and similarly determines whether or not SA_L≦SA_peak≦SA_H is satisfied.

That is, after determining the value SA_peak based on the first three points in the above-described manner, the system controller 10 determines whether or not the value SA_peak is within a range between the minimum value SA_L and the maximum value SA_H, among three points, (i.e., SA_L≦SA_peak≦SA_H).

Then, if a result of this determination indicates that SA_L≦SA_peak≦SA_H is not satisfied, the system controller 10 alters the spherical aberration correction value SA by the alteration step A in a direction approaching the determined value SA_peak (i.e., in a direction that the amplitude value of the tracking error signal TE increases) to obtain a new point. More specifically, referring to this drawing, the spherical aberration correction value SA is altered to a position +A greater than the position SA_H (i.e., SA=+2A). The system controller 10 stores an amplitude value of the tracking error signal TE obtained at that time.

The system controller 10 then calculates the second-order approximation of the three points including this point to determine a value SA_peak. The system controller 10 also determines whether or not SA_L≦SA_peak≦SA_H is satisfied similarly.

For confirmation, three spherical aberration correction values newly obtained by altering the spherical aberration correction value by the alteration step A in the above-described manner are referred to as "SA_L", "SA_M", and "SA_H" in the ascending order of the correction value. Thus, "SA_L" and "SA_H" shown in <2> correspond to SA=0 (the initial position) and SA=+2A in the drawing, respectively.

If a result of this determination indicates that SA_L≦SA_peak≦SA_H is not satisfied again, the system controller 10 repeats altering of the spherical aberration correction value SA by the alteration step A in the direction of SA_peak, the calculation of the second-order approximation and the value SA_peak, and the determination of whether or not SA_L≦SA_peak≦SA_H is satisfied in the similar manner.

If the system controller 10 determines that SA_L≦SA_peak≦SA_H is satisfied, the system controller 10 fixes the spherical aberration correction value SA as the value SA_peak as shown by <3> in the drawing. That is, the system controller 10 fixes the calculated SA_peak value as an adjustment value, and terminates the coarse adjustment operation.

The embodiment employs a method for determining a point that gives a maximum (optimum) amplitude value of the tracking error signal TE on the basis of a result of the second-order approximation performed using amplitude values of the tracking error signal TE obtained under setting conditions of three spherical aberration correction values.

However, in the case of performing the second-order approximation using a relatively small number of points, such as three, the calculated quadratic curve is not necessarily in accordance with the appropriate property of amplitude of the tracking error signal, which should be taken into account to perform an adjustment operation. More specifically, the amplitude property of the tracking error signal with respect to the change in the spherical aberration correction value is supposed to be represented by a convex-upward quadratic curve. However, depending on the second-order approximation of the above-described three points, a convex downward quadratic curve may be calculated, which should be taken into account.

Accordingly, in practice, the system controller 10 performs operations compatible with cases where a quadratic curve calculated from the second-order approximation is not convex upward as shown in FIGS. 5A and 5B.

For example, FIG. 5A illustrates a case where a quadratic curve resulting form the second-order approximation of three points, including points obtained by altering the correction value SA from the initial position by the alteration step ±A, is convex downward. If the convex downward quadratic curve is obtained, the system controller 10 first checks a slope of the tracking error signal TE as illustrated in the drawing, and alters the spherical aberration correction value SA to another point in a direction that the amplitude value of the tracking error signal TE increases. More specifically, the system controller 10 compares the amplitude values of the tracking error signal TE (i.e., TE_L and TE_H) at the minimum spherical aberration correction value SA_L (i.e., −A in the drawing) and at the maximum spherical aberration correction value SA_H (i.e., +A in the drawing) among three points, thereby checking the slope of the tracking error signal TE. On the basis of this result, the system controller 10 performs an operation to alter the spherical aberration correction value to another point in the direction that the amplitude value of the tracking error signal TE increases. That is, in this case, as shown in FIG. 5B, the system controller 10 alters the spherical aberration correction value to a value SA=+2A, which is +A greater than SA=+A.

After altering the spherical aberration correction value to a new point, the system controller 10 stores an amplitude value of the tracking error signal TE obtained under the spherical aberration correction value setting condition. The system controller 10 then calculates the second-order approximation of three points, including the newly obtained point, similarly, to determine a value of SA_peak.

If this second-order approximation results in a convex-upward quadratic curve as illustrated in the drawing, the system controller 10 performs an operation based on the determination of SA_L≦SA_peak≦SA_H. More specifically, as described with reference to FIG. 4, if SA_L≦SA_peak≦SA_H is not satisfied, the system controller 10 alters the spherical aberration correction value SA by the alteration step A in a direction approaching the value SA_peak to obtain a new point. The system controller 10 then calculates the second-order approximation of three points including the newly obtained one. The system controller 10, similarly, determines whether or not SA_L≦SA_peak≦SA_H is satisfied. On the other hand, if SA_L≦SA_peak≦SA_H is satisfied, the system controller 10 fixes the calculated SA_peak value as an adjustment value.

If the quadratic curve resulting from the second-order approximation is still convex downward, the system controller 10 repeats the above-described operation until the convex-upward quadratic curve is obtained.

In the above-given description, the amplitude values (i.e., TE_L and TE_H) of the tracking error signal TE at the minimum and maximum values SA_L and SA_H among the three spherical aberration correction values are compared to determine the slope of the amplitude value of the tracking error signal TE. However, these amplitude values TE_L and TE_H do not necessarily differ. In some cases, the value TE_L may be equal to the value TE_H. If the value TE_L is determined to be equal to the value TE_H at the time of detection of the slope, the system controller 10 fixes the intermediate value SA_M between the obtained spherical aberration correction values (SA_L and SA_H) as the adjustment value. More specifically, if the value TE_L is equal to the value TE_H, the maximum amplitude value of the tracking error signal TE is highly likely to exist between the value SA_L and the value SA_H. Thus, the system controller 10 fixes the adjustment value at the value SA_M, which is an intermediate point between the value SA_L and the value SA_H, and terminates the operation.

Coarse Adjustment Operation According to Embodiments

The coarse adjustment method described with reference to FIG. 4 and FIGS. 5A and 5B is also employed in the related art. A coarse adjustment operation according to an embodiment of the present invention corresponds to such a coarse adjustment operation in the related art with limit spherical aberration correction values being attached.

Figure 6A:
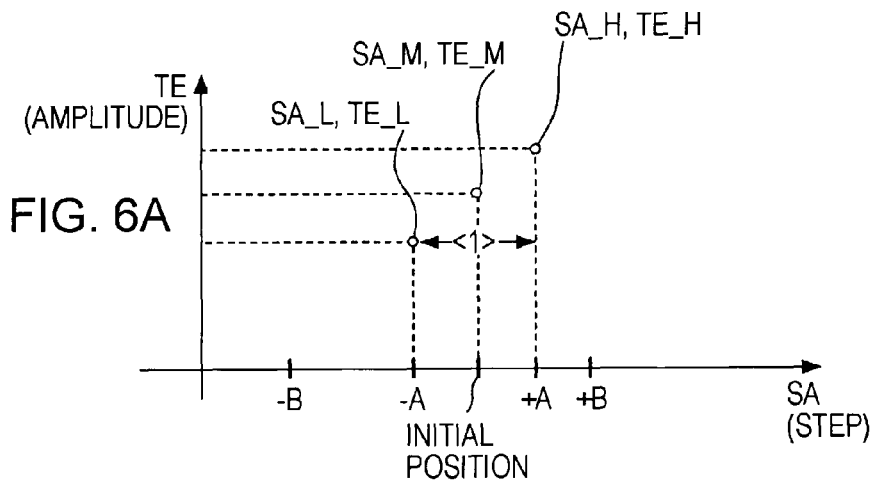
FIGS. 6A to 6C describe a coarse adjustment operation according to an embodiment of the present invention.
Figure 6B:
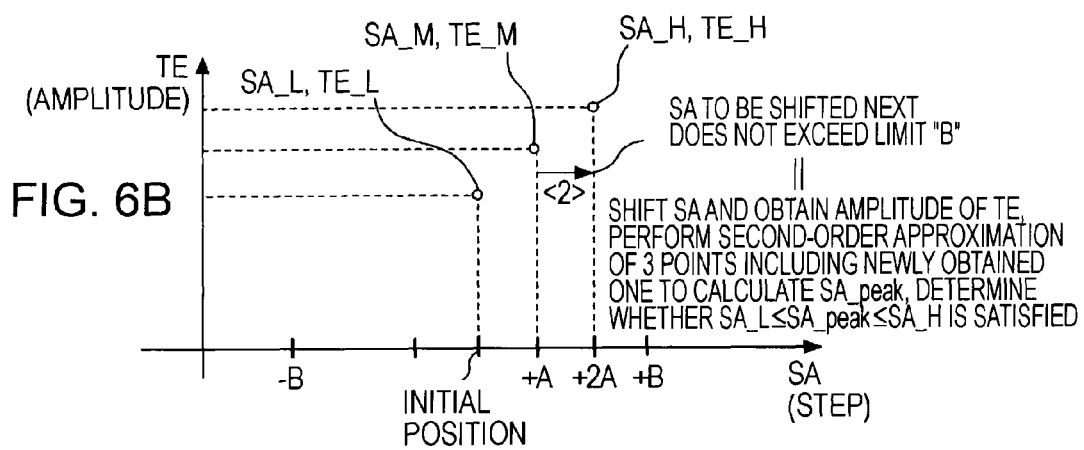
Figure 6C:
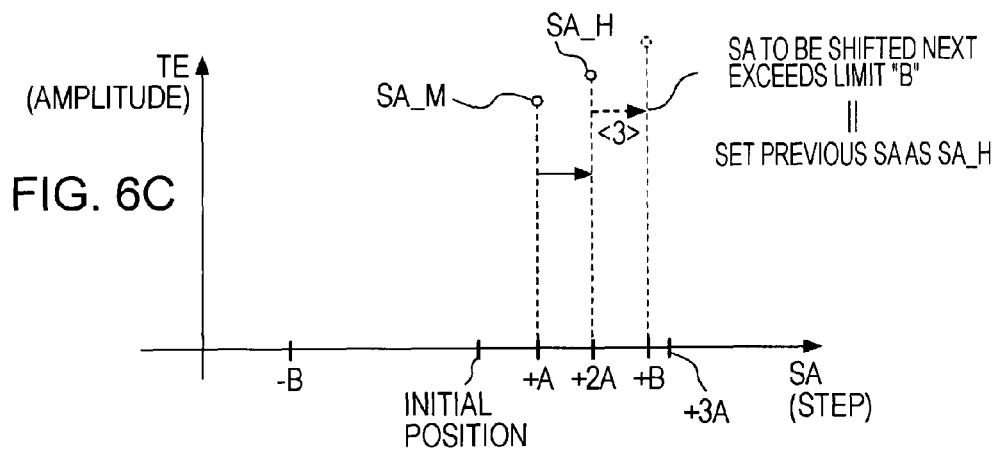

The coarse adjustment operation according to the embodiment will be described with reference to FIGS. 6A to 6C. FIGS. 6A to 6C schematically illustrate the coarse adjustment operation according to the embodiment on a two-dimensional plane having a horizontal axis representing a spherical aberration correction value (SA) and a vertical axis representing an amplitude value of a tracking error signal TE.

As illustrated in each of FIGS. 6A, 6B, and 6C, in the embodiment, a predetermined limit value "B" is set regarding a range within which the spherical aberration correction value is altered for adjustment. This limit value "B" is set on both positive and negative sides ("−B" and "+B" in the drawings) of the initial position, as illustrated in the drawings, on the assumption that the actual property of the amplitude value of the tracking error signal TE for the change in the spherical aberration correction value differs for each medium or drive, for example. In addition, the limit value has only to be smaller than the maximum settable spherical aberration correction value. In practice, an optimum value determined on the basis of a result of an experiment or the like may be set as the limit value.

Referring to FIG. 6A, as in the case of the description of <1> in FIG. 4, the system controller 10 first alters the spherical aberration correction value SA by the alteration step ±A with respect to the initial position as the coarse adjustment operation. The system controller 10 then calculates the second-order approximation of the three points including the initial position to determine a spherical aberration correction value SA_peak that gives a maximum amplitude value of the tracking error signal TE. The system controller 10 then determines whether or not SA_L≦SA_peak≦SA_H is satisfied.

In this case, if SA_L≦SA_peak≦SA_H is satisfied, the system controller 10 fixes the calculated value SA_peak as an adjustment value.

On the other hand, according to the foregoing description with reference to FIG. 4, if SA_L≦SA_peak≦SA_H is not satisfied, the system controller 10 further alters the spherical aberration correction value SA by the alteration step A to obtain a new point. The system controller 10 calculates the second-order approximation of the three points including the newly obtained point to determine the value SA_peak. The system controller 10 then determines whether or not SA_L≦SA_peak≦SA_H is satisfied. In the embodiment, before altering the spherical aberration correction value to a new point, whether or not the spherical aberration correction value to be altered next is smaller than the limit value (hereinafter, simply referred to as limit) "B" is additionally determined. If a result of this determination indicates that the correction value is smaller than the limit "B", the system controller 10 alters the spherical aberration correction value SA to a new point as illustrated in the drawings, and obtains the amplitude value of the tracking error signal TE. The system controller 10 then calculates the second-order approximation of the three points including the newly obtained one to determine the value SA_peak. The system controller 10 determines whether or not SA_L≦SA_peak≦SA_H is satisfied.

On the other hand, if the spherical aberration correction value SA to be altered next is not smaller than the limit "B" as illustrated in FIG. 6C, for example, the system controller 10 fixes the current spherical aberration correction value SA as an adjustment value. An example illustrated in the drawings shows a case where the spherical aberration correction value SA to be altered next is equal to +3A (SA=+3A), which is not smaller than "B" (SA=+3A≧"B"). Thus, the current spherical aberration correction value SA=+2A is fixed as the adjustment value.

Such a limit value of the spherical aberration correction value is similarly employed in the operations described with reference to FIGS. 5A and 5B.

More specifically, according to the description given with reference to FIGS. 5A and 5B, an operation to further altering the spherical aberration correction value by the alteration step A is performed even if the quadratic curve resulting from the second-order approximation is not convex upward. In this case, the system controller 10 also determines whether or not the spherical aberration correction value to be altered next is smaller than the limit value (limit) "B" before altering the spherical aberration correction value to a new one. If a result of this determination indicates that the correction value to be altered is smaller than the limit "B", the system controller 10 alters the spherical aberration correction value to the new one, and obtains an amplitude value of the tracking error signal TE. The system controller 10 calculates the second-order approximation again in the manner described above on the basis of the result, and determines whether or not the calculated quadratic curve is convex upward.

On the other hand, if the spherical aberration correction value SA to be altered next is not smaller than the limit "B", the system controller 10 fixes the current spherical aberration correction value SA as the adjustment value.

Fine Adjustment Operation after Coarse Adjustment

Now, in an embodiment, fine adjustment of both the spherical aberration correction value and the focus bias is performed after the above-described coarse adjustment operation of the spherical aberration correction value.

More specifically, the system controller 10 performs this fine adjustment operation by receiving a jitter value calculated by the evaluator 5a, illustrated in FIG. 1, in response to changing the spherical aberration correction value and the focus bias with both the focus servo and the tracking servo being operating.

In this fine adjustment, the system controller 10 sets an initial position of the spherical aberration correction value to be set for the fine adjustment to the one fixed by the above-described coarse adjustment operation. Regarding the focus bias, a predetermined value may be set as the initial position.

Regarding specific methods for the fine adjustment operation performed on the basis of the jitter value in this manner, every method, such as, for example, various methods that have been suggested hitherto and that will be suggested hereafter, for adjusting both the spherical aberration correction value and the focus bias using the jitter value as the evaluation value can be employed, and such methods are not limited particularly herein.

For example, a method described below can be employed.

Firstly, the system controller 10 decides each spherical aberration correction value to be altered during the adjustment on the basis of the spherical aberration correction value decided during the coarse adjustment. In addition, regarding the value of the focus bias, the system controller 10 decides each focus bias value to be altered during the adjustment on the basis of, for example, the initial position.

Thereafter, the system controller 10 first executes a reproduction operation with one pair of the spherical aberration correction value and the focus bias value decided in this manner being set. The system controller 10 then obtains the jitter value calculated by the evaluator 5a in response to the setting, and stores the jitter value in association with the set spherical aberration correction value and focus bias value.

The system controller 10 performs such an operation for each pair of the spherical aberration correction value and the focus bias value decided in the above-described manner. For example, in a case where five spherical aberration correction values (SA=5) and five focus bias values (FB=5) are set to be altered, the system controller 10 executes the above-described operation for each of a total of 25 (=5×5) pairs of the spherical aberration correction value and the focus bias value. The system controller 10 then determines an optimum spherical aberration correction value and an optimum focus bias value on the basis of the jitter value under each setting condition of the pair of the spherical aberration correction value and the focus bias value obtained by this operation. More specifically, the system controller 10 determines a pair of the spherical aberration correction value and the focus bias value that minimizes (optimize) the jitter value, for example, and fixes these values as the adjustment values of the fine adjustment.

In the embodiment having been described, as the coarse adjustment performed only on the spherical aberration correction value with only the focus servo being turned on, a predetermined limit value (limit) is provided for the spherical aberration correction value, and the adjustment value is fixed on the basis of the amplitude value of the tracking error signal obtained in response to changing the spherical aberration correction value during the adjustment and on this limit value.

By performing the coarse adjustment with a predetermined limit value imposed on the spherical aberration correction value in this manner, it can be advantageously prevented that the coarsely adjusted spherical aberration correction value deviates from the optimum value on the property of the evaluation value, even if directions of axes of the property of the amplitude value of the tracking error signal and the property of the jitter value differ from one another as described above, unlike a case where adjustment for narrowing the spherical aberration correction value to the one that optimizes the amplitude value of the tracking error signal in a manner employed in the related art, for example.

As a result, in a case where the directions of the axes of the properties differ as described above, it is possible to lower likelihood that data reproduction and address detection may not be performed depending on the setting of the coarsely adjusted spherical aberration correction value, which occurs in the related art, thus allowing the system controller 10 to perform the fine adjustment when the axis directions differ significantly. That is, it is possible to expand a fine adjustment executable range with respect to the difference in the axis directions.

As a factor worsening the position of the coarsely adjusted spherical aberration correction value on the property of the jitter value, it is considered that the initial positions of the spherical aberration correction value and the focus bias set at the time of the start of the coarse adjustment deviate from the positions (optimum values) of the spherical aberration correction value and the focus bias to be narrowed during the fine adjustment performed thereafter.

To take this into account, the embodiment capable of preventing the position of the spherical aberration correction value from worsening on the property of the jitter value used during the fine adjustment in the above-described manner can expand a fine adjustment performable range with respect to the worsening of the initial values of such spherical aberration correction value and the focus bias.

Figure 7A:
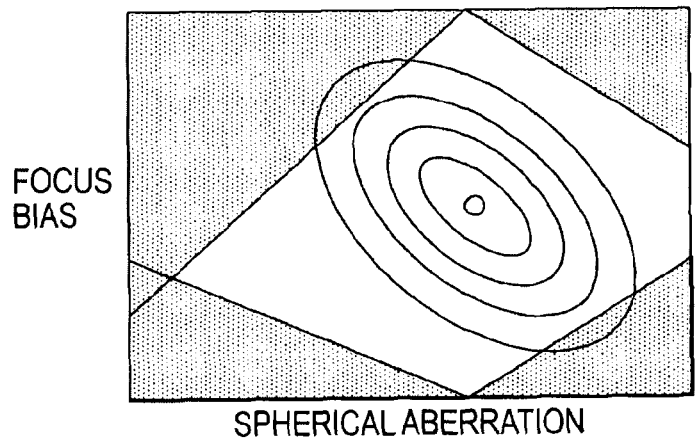
FIGS. 7A to 7C show a altering unsuitable range in a case where coarse adjustment is not performed, in a case where coarse adjustment (without limit) is performed, and in a case where coarse adjustment with limit according to an embodiment of the present invention to describe effectiveness of a coarse adjustment operation according to the embodiment of the present invention, respectively.
Figure 7B:
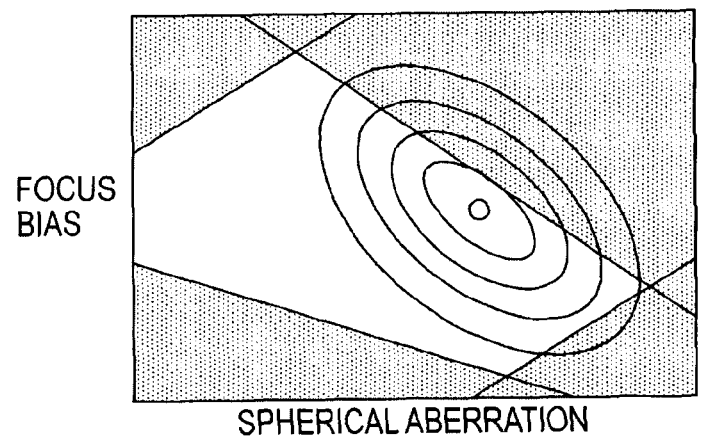
Figure 7C:
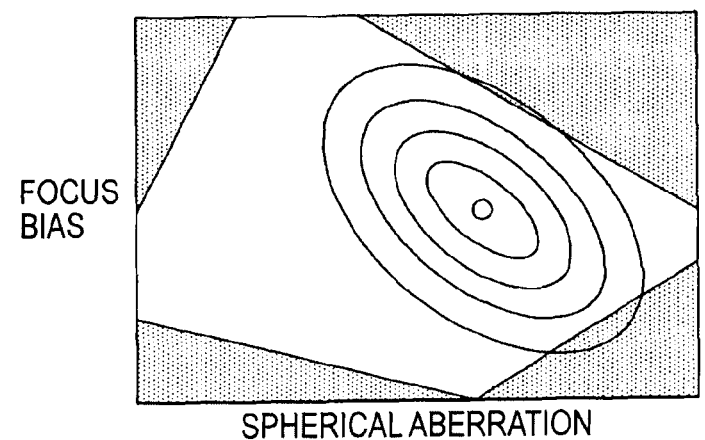

FIGS. 7A to 7C illustrate experiment results to describe an effectiveness of the coarse adjustment operation according to the embodiment. More specifically, FIG. 7A illustrate a result of an experiment performed for a case where coarse adjustment of the spherical aberration correction value is not performed, whereas FIGS. 7B and 7C illustrate results of experiments performed for a case where coarse adjustment employed in the related art (i.e., the coarse adjustment without the limit) is performed and for a case where coarse adjustment with the limit according to the embodiment is performed, respectively.

FIGS. 7A to 7C show a property of a jitter value (a contour map) when focus bias and spherical aberration (spherical aberration correction value) are represented by the vertical and horizontal axes, respectively. A white dot in each drawing indicates an optimum value (a target value) toward which the spherical aberration correction value and the focus bias are finely adjusted on the basis of the jitter value.

In addition, referring to FIGS. 7A to 7C, a shading part in each drawing indicates a range (hereinafter, referred to as an narrowing unsuitable range) from which the spherical adjustment correction value and the focus bias may not be adjusted to the target value of the fine adjustment indicated by the white dot. More specifically, the spherical aberration correction value and the focus bias residing within this narrowing unsuitable range may not be adjusted to the target value of the fine adjustment.

Figure 12A:
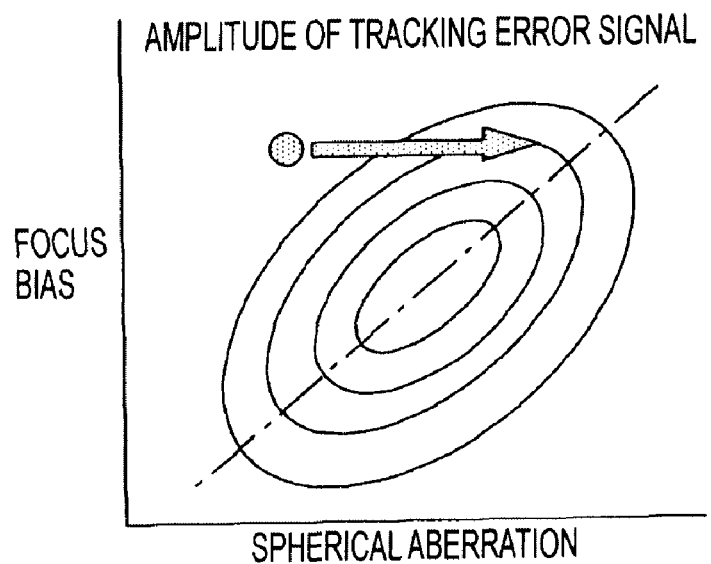
FIGS. 12A and 12B illustrate a spherical aberration correction value coarsely adjusted on the basis of an amplitude value of a tracking error signal on a property map (contours) of the amplitude value of the tracking error signal with respect to changes in the spherical aberration correction value and focus bias and on a property map (contours) of a jitter value, respectively, to describe a case where axes of the property of the amplitude value of the tracking error signal and of the property of the jitter value differ.
Figure 12B:
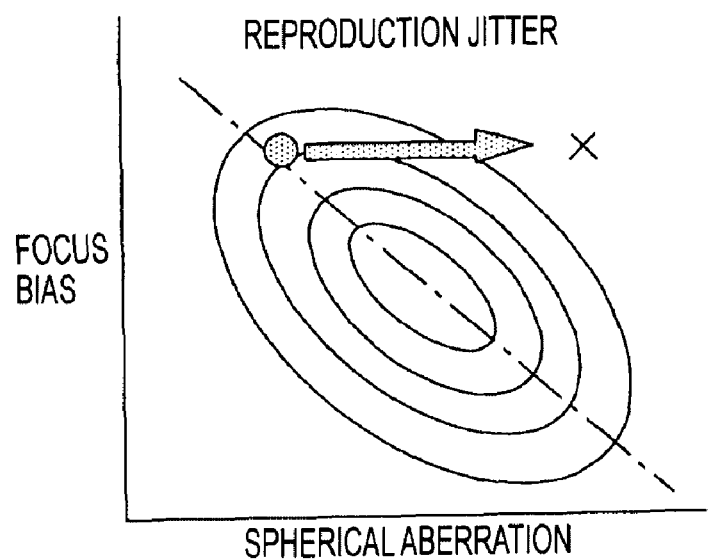

For confirmation, FIGS. 7A to 7C illustrate results of experiments performed when a difference is caused between the axis directions of the property of the amplitude value of the tracking error signal TE and the property of the jitter value, as shown in FIGS. 12A and 12B.

Comparison of FIGS. 7A and 7B shows that, in a case where the difference of axis directions is caused between the properties of the tracking error signal TE and of the jitter value, the narrowing unsuitable range expands more when a coarse adjustment (without the limit) is performed than when the coarse adjustment is not performed. Thus, it can be understood that performing the coarse adjustment negatively affects the fine adjustment on the contrary.

On the other hand, when the limit-attached coarse adjustment according to the embodiment is performed, which is shown in FIG. 7C, the narrowing unsuitable range shrinks (that is, the narrowing suitable range expands) when it compared with both the case where the coarse adjustment is not performed and the case where the coarse adjustment (without limit) is performed. Thus, it can be understood that a more-stable fine adjustment operation can be realized.

3. Processing Operations for Realizing Coarse Adjustment Operation

Processing operations for realizing a coarse adjustment operation according to an embodiment will be described next with reference to flowcharts of FIGS. 8 to 10.

The processing operations shown in these drawings are executed on the basis of programs stored in a memory, such as, for example, a ROM, included in the system controller 10.

In addition, prior to execution of the processing operations shown in these drawings, focus servo has been already turned on.

Figure 8:
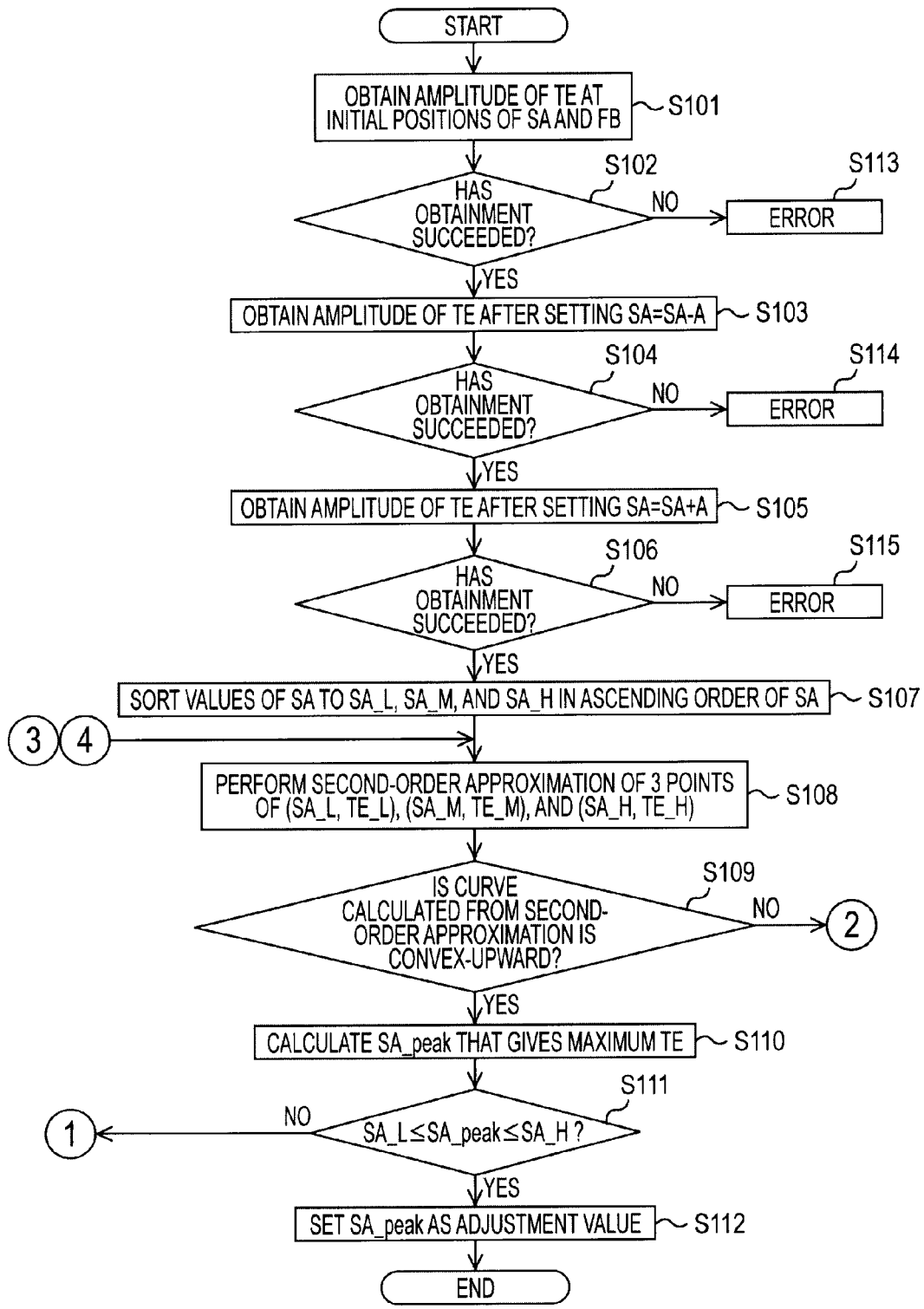
FIG. 8 is a flowchart illustrating processing operations for realizing a coarse adjustment operation according to an embodiment of the present invention.

Referring to FIG. 8, at STEP S101, the system controller 10 obtains an amplitude value of the tracking error signal TE at initial positions of the spherical aberration correction value (SA) and the focus bias (FB). More specifically, the system controller 10 first informs the spherical aberration correction value setter 24 and the focus bias setter 23 included in the servo circuit 11 of the initial spherical aberration correction value and the initial focus bias value to cause the spherical aberration correction value setter 24 and the focus bias setter 23 to execute setting operations of the spherical aberration correction value and the focus bias informed as the initial positions, respectively. Then, the system controller 10 causes the optical pickup OP to read a signal from the optical disc D, and obtains an amplitude value of the tracking error signal TE supplied from the matrix circuit 4 in response to the reading.

At STEP S102, the system controller 10 determines whether or not the obtainment of the amplitude value has succeeded. If a negative result that the obtainment of the amplitude value of the tracking error signal TE is not successful as a result of the processing for obtaining the amplitude value performed at STEP S101, the process proceeds to STEP S113. At STEP S113, the system controller 10 executes, for example, predetermined error processing.

On the other hand, if a positive result that the obtainment of the amplitude value has succeeded at STEP S102, the process proceeds to STEP S103. At STEP S103, the system controller 10 alters the spherical aberration correction value by the alteration step −A (SA=−A), and obtains the amplitude value of the tracking error signal TE. More specifically, the system controller 10 informs the spherical aberration correction value setter 24 of a value obtained by subtracting A from the above-described initial position. The system controller 10 also causes the optical pickup OP to execute reading of a signal, and obtains the amplitude value of the tracking error signal TE supplied from the matrix circuit 4 in response to the reading.

Then, at STEP S104, the system controller 10 determines whether or not the obtainment of the amplitude value has succeeded as in the case of STEP S102. If the obtainment of the amplitude value has not succeeded, the system controller 10 executes error processing at STEP S114.

If the obtainment of the amplitude value has succeeded, the process proceeds to STEP S105. At STEP S105, the system controller 10 alters the spherical aberration correction value by alteration step +A (SA=+A), and obtains the amplitude value of the tracking error signal TE.

At STEP S106, the system controller 10 determines whether or not the obtainment of the amplitude value has succeeded similarly. If the obtainment of the amplitude value has not succeeded, the system controller 10 executes error processing at STEP S115.

If the obtainment of the amplitude value has succeeded at STEP S106, the process proceeds to STEP S107. At STEP S107, the system controller 10 sorts the spherical aberration correction values as SA_L, SA_M, and SA_H in the ascending order of the spherical aberration correction values SA. At STEP S108, the system controller 10 calculates the second-order approximation using three points of (SA_L, TE_L), (SA_M, TE_M), and (SA_H, TE_H). More specifically, the system controller 10 calculates the second-order approximation using each of the spherical aberration correction values SA_L, SA_M, and SA_H as well as the amplitude values of the tracking error signal TE, i.e., TE_L, TE_M, and TE_H, obtained under the setting condition of the corresponding spherical aberration correction values to determine a quadratic curve that passes through these three points. More specifically, the system controller 10 calculates a quadratic curve of "$y=ax^2+bx+c$", where y represents the amplitude value of the tracking error signal TE and x represents the spherical aberration correction value.

Then, at STEP S109, the system controller 10 determines whether or not the curve determined from the second-order approximation is convex upward. More specifically, the system controller 10 determines whether or not a coefficient of "$x^2$" of the determined quadratic curve (i.e., the above-described "a") is a negative value.

Figure 10:
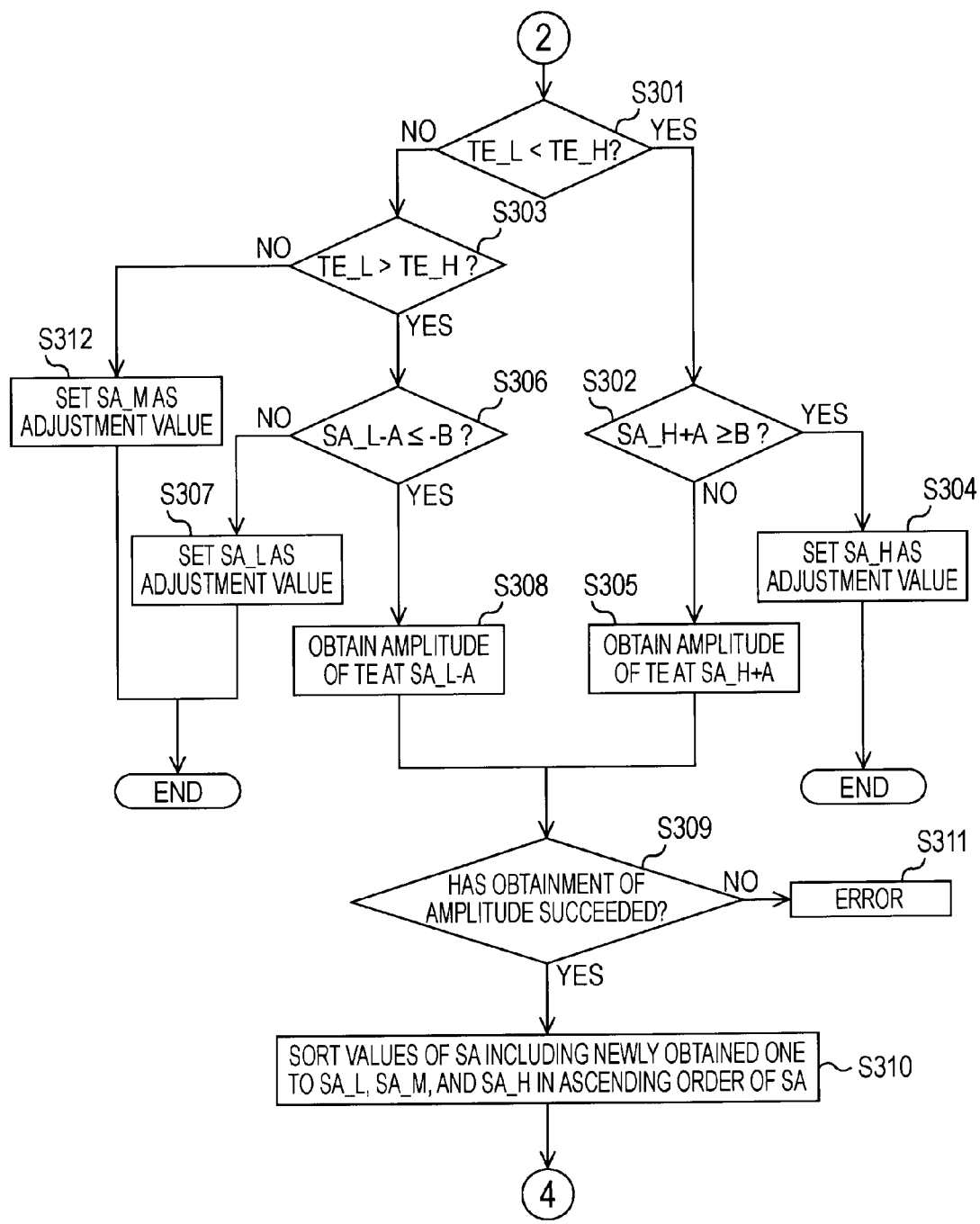
FIG. 10 is a flowchart illustrating processing operations for realizing a coarse adjustment operation according to an embodiment of the present invention.
Figure 11A:
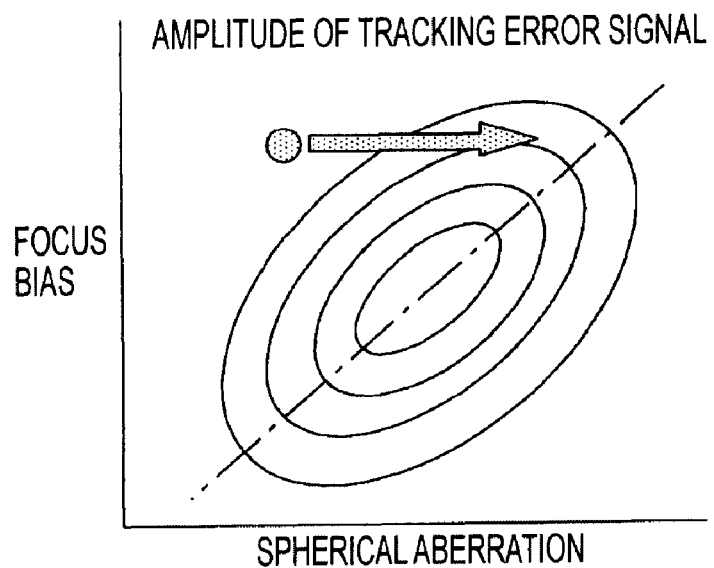
FIGS. 11A and 11B illustrate a spherical aberration correction value coarsely adjusted on the basis of an amplitude value of a tracking error signal on a property map (contours) of the amplitude value of the tracking error signal with respect to changes in the spherical aberration correction value and focus bias and on a property map (contours) of a jitter value, respectively.
Figure 11B:
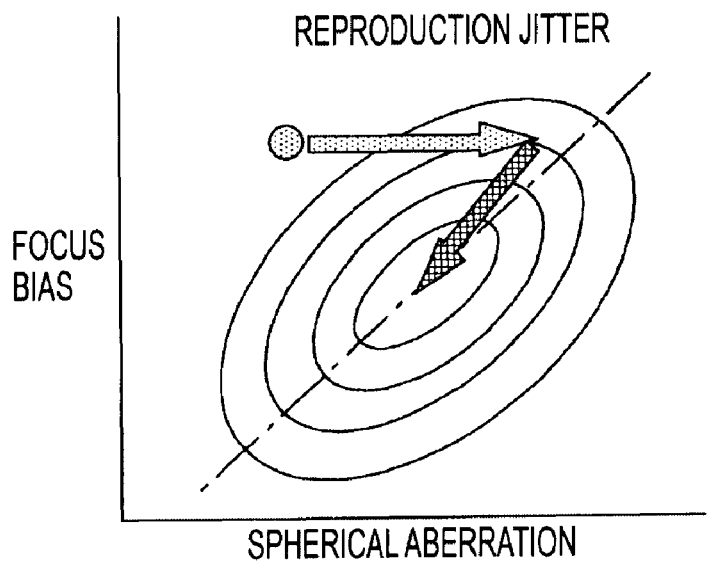

If a negative result that the quadratic curve is not convex upward is obtained, the system controller 10 advances the process to STEP S301 shown in FIG. 10.

On the other hand, if a positive result that the quadratic curve is convex upward is obtained, the process proceeds to STEP S110. At STEP S110, the system controller 10 determines a spherical aberration correction value (SA_peak) at which the amplitude value of the tracking error signal TE reaches its peak position. That is, the system controller 10 determines a value of "x" that maximizes the value of "y" on the basis of the calculated quadratic curve.

Then, the system controller 10 determines whether or not SA_L≦SA_peak≦SA_H is satisfied at STEP S111. If a positive result that SA_L≦SA_peak≦SA_H is satisfied is obtained, the system controller 10 sets the spherical aberration correction value SA_peak as an adjustment value at STEP S112, and then terminates the process.

Figure 9:
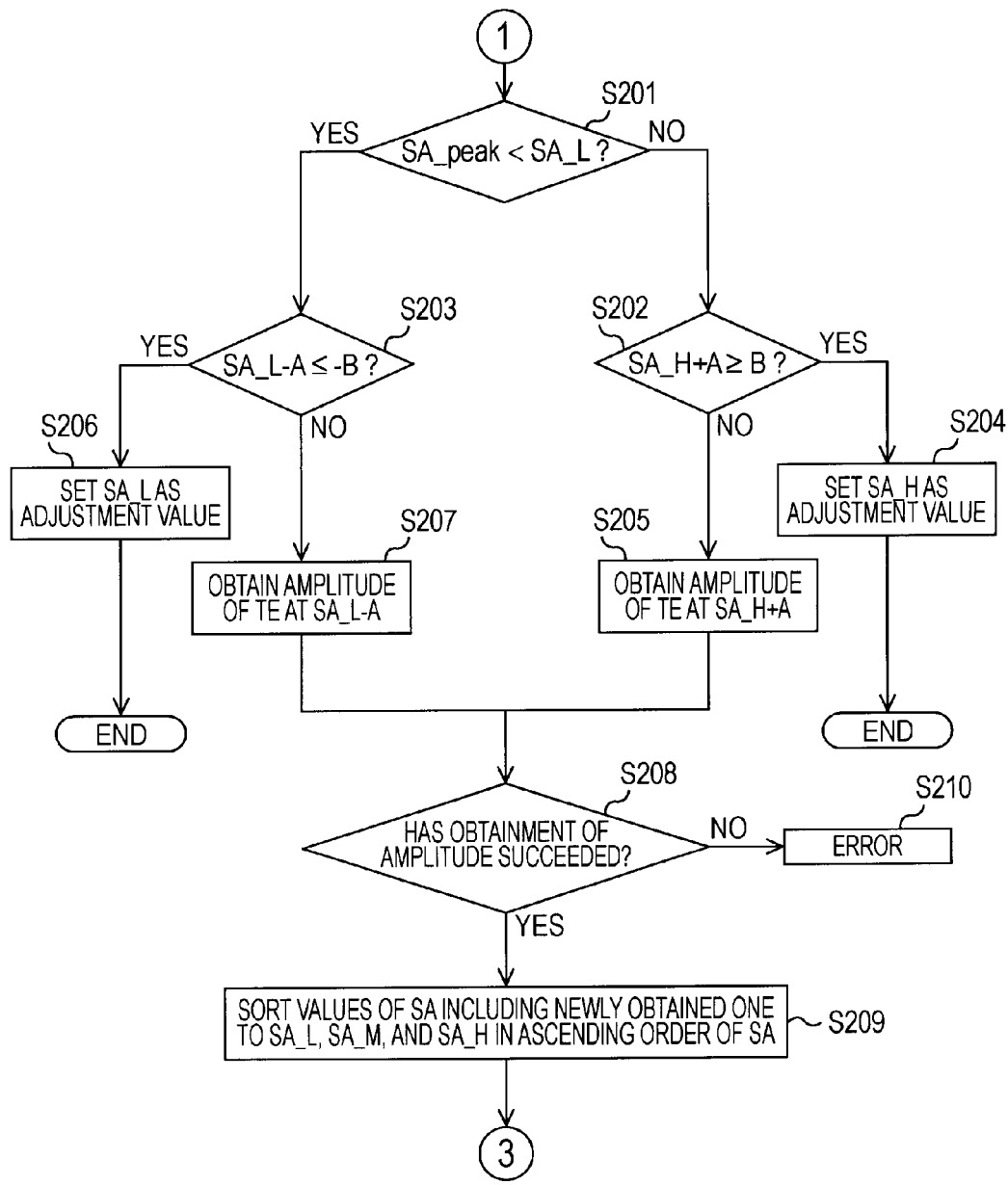
FIG. 9 is a flowchart illustrating processing operations for realizing a coarse adjustment operation according to an embodiment of the present invention.

On the other hand, if a negative result that SA_L≦SA_peak≦SA_H is not satisfied is obtained, the system controller 10 advances the process to STEP S201 shown in FIG. 9.

Referring now to FIG. 9, the system controller 10 first determines whether or not SA_peak<SA_L is satisfied at STEP S201. More specifically, the processing performed at STEP S201 is the one for identifying a direction approaching the calculated SA_peak (i.e., a direction that the amplitude value of the tracking error signal TE increases).

If a negative result that SA_peak<SA_L is not satisfied, i.e., that the direction that the amplitude value of the tracking error signal TE increase is not the negative direction, is obtained at STEP S201, the process proceeds to STEP S202. At STEP S202, the system controller 10 determines whether SA_H+A≧B is satisfied. More specifically, since the direction that the amplitude value of the tracking error signal TE increases is the positive direction in this case, the system controller 10 determines whether a value obtained by adding the alteration step A to SA_H, which is the maximal value of the three points, is not smaller than the limit value B in the above-described manner, thereby determining whether or not the spherical aberration correction value to be altered next is not smaller than the limit value.

If a positive result that SA_H+A≧B is satisfied, i.e., that the spherical aberration correction value to be altered next is not smaller than the limit value B, is obtained at STEP S202, the process proceeds to STEP S204. At STEP S204, the system controller 10 sets the spherical aberration correction value SA_H as an adjustment value, and then terminates the process.

The coarse adjustment operation based on the limit value is executed through the processing performed at STEPs S202 and S204. That is, to realize the coarse adjustment operation according to an embodiment, the processing performed at STEPs S202 and S204 has to be added to processing performed in the related art.

On the other hand, if a negative result that SA_H+A≧B is not satisfied, i.e., that the spherical aberration correction value to be altered next is smaller than the limit value B, is obtained, the process proceeds to STEP S205. At STEP S205, the system controller 10 obtains an amplitude value of the tracking error signal TE at the spherical aberration correction value SA_H+A, and then advances the process to STEP S208.

If a positive result that SA_peak<SA_L is satisfied, i.e., that the direction that the amplitude value of the tracking error signal TE increases is the negative direction, is obtained at STEP S201, the process proceeds to STEP S203. At STEP S203, the system controller 10 determines whether or not SA_L−A≦−B is satisfied. More specifically, since the direction that the amplitude value of the tracking error signal TE increases is the negative direction as described above, the system controller 10 determines whether or not a value obtained by subtracting the alteration step A from the spherical aberration correction value SA_L, i.e., the minimum value among the three points, is not greater than the limit value −B, thereby determining whether the spherical aberration correction value to be altered next is not smaller than the limit value (with respect to the absolute value).

If a positive result that SA_L−A≦−B is satisfied, i.e., that the spherical aberration correction value to be altered next is not greater than the limit value −B, is obtained at STEP S203, the process proceeds to STEP S206. At STEP S206, the system controller 10 sets the spherical aberration correction value SA_L as the adjustment value, and then terminates the process.

The coarse adjustment operation based on the limit value is also executed through processing of STEPs S203 and S206. Accordingly, the processing performed at STEPs S203 and S206 also has to be added to the processing performed in the related art.

On the other hand, if a negative result that SA_L−A≦−B is not satisfied, i.e., that the spherical aberration correction value to be altered next is greater than the limit value −B, is obtained, the process proceeds to STEP S207. The system controller 10 obtains an amplitude value of the tracking error signal TE at the spherical aberration correction value SA_L−A at STEP S207, and then advances the process to STEP S208.

At STEP S208, the system controller 10 determines whether or not the obtainment of the amplitude value has succeeded. If the obtainment has not succeeded, the system controller 10 executes error processing at STEP S210.

If the obtainment of the amplitude value has succeeded, the process proceeds to STEP S209. At STEP S209, the system controller 10 sorts the spherical aberration correction values SA, including the newly obtained point, as SA_L, SA_M, and SA_H in the ascending order of SA, and brings the process back to STEP S108 shown in FIG. 8.

If a negative result that the calculated quadratic curve is not convex upward is obtained at STEP S109 shown in FIG. 8, the system controller 10 advances the process to STEP S301 shown in FIG. 10, as described above.

Referring to FIG. 10, the system controller 10 determines whether TE_L<TE_H is satisfied at STEP S301. That is, the system controller 10 identifies a direction that the amplitude value of the tracking error signal TE increases (a direction of the slope of the tracking error signal TE) through this processing performed at STEP S301.

If a positive result that TE_L<TE_H is satisfied, i.e., that the direction that the amplitude value of the tracking error signal TE increases is the positive direction, is obtained at STEP S301, the process proceeds to STEP S302. At STEP S302, the system controller 10 determines whether or not SA_H+A≧B is satisfied. More specifically, since the direction that the amplitude value of the tracking error signal TE increases is the positive direction in this case as described above, the system controller 10 determines the value obtained by adding the alteration step A to the spherical aberration correction value SA_H, which is the maximum value among the three points, is not smaller than the limit value B, thereby determining whether or not the spherical aberration correction value to be altered next is not smaller than the limit value.

If a positive result that SA_H+A≧B is satisfied, i.e., that the spherical aberration correction value to be altered next is not smaller than the limit value B, is obtained at STEP S302, the process proceeds to STEP S304. The system controller 10 sets the spherical aberration correction value SA_H as the adjustment value at STEP S304, and then terminates the process.

That is, the coarse adjustment operation based on the limit value is also executed through STEPs S302 and S304. Accordingly, to realize the coarse adjustment operation according to the embodiment, processing performed at STEPs S302 and S304 also has to be added.

On the other hand, if a negative result that SA_H+A≧B is not satisfied, i.e., that the spherical aberration correction value to be altered next is smaller than the limit value B, is obtained, the process proceeds to STEP S305. The system controller 10 obtains an amplitude value of the tracking error signal TE at the spherical aberration correction value SA_H+A at STEP S305, and advances the process to STEP S309.

If a negative result that TE_L<TE_H is not satisfied, i.e., that the direction that the amplitude value of the tracking error signal TE increases is not the positive direction, is obtained at STEP S301, the process proceeds to STEP S303. At STEP S303, the system controller 10 determines whether or not TE_L>TE_H is satisfied this time. More specifically, the system controller 10 determines whether or not the direction of the slope of the tracking error signal TE is the negative direction.

If it is determined that TE_L>TE_H is not satisfied, i.e., that the direction of the slope of the tracking error signal TE is not the negative direction at STEP S303, which, in conjunction with the determination result at STEP S301, means that the value TE_L and the value TE_H are the same value. Accordingly, if it is determined that TE_L>TE_H is not satisfied at STEP S303 and it is revealed that the value TE_L and the value TE_H are the same value, the process proceeds to STEP S312 as shown in the drawing. The system controller 10 sets the spherical aberration correction value SA_M as the adjustment value at STEP S312, and then terminates the process.

More specifically, as described before, the value TE_L and the value TE_H being the same value means that the maximum amplitude value of the tracking error signal TE is highly likely to exist between the value SA_L and the value SA_H. Thus, the system controller 10 sets the adjustment value to the value SA_M, which is an intermediate point between the value SA_L and the SA_H, and then terminates the process.

On the other hand, a positive result that TE_L>TE_H is satisfied, i.e., that the direction of the slope of the tracking error signal TE is the negative direction, is obtained at STEP S303, the process proceeds to STEP S306. The system controller 10 determines whether or not SA_L−A≦−B is satisfied. More specifically, since the direction that the amplitude value of the tracking error signal TE increases is the negative direction as described above, the system controller 10 determines whether or not the value obtained by subtracting the alteration step A from the value SA_L, which is the minimum value of the three points, is not greater than the limit value −B, thereby determining whether or not the spherical aberration correction value to be altered next is not smaller than the limit value (with respect to the absolute value).

If a positive result that SA_L−A≦−B is satisfied, i.e., that the spherical aberration correction value to be altered next is not greater than the limit value −B, is obtained at STEP S306, the process proceeds to STEP S307. The system controller 10 sets the spherical aberration correction value SA_L as the adjustment value at STEP S307, and then terminates the process.

The coarse adjustment operation based on the limit value is also executed through STEPs S306 and S307. Accordingly, the processing performed at STEPs S306 and S307 also has to be added to the processing performed in the related art.

On the other hand, if a negative result that SA_L−A≦−B is not satisfied, i.e., that the spherical aberration correction value to be altered next is greater than the limit value −B, is obtained, the process proceeds to STEP S308. The system controller 10 obtains an amplitude value of the tracking error signal TE at the spherical aberration correction value SA_L−A at STEP S308, and then advances the process to STEP S309.

At STEP S309, the system controller 10 determines whether or not the obtainment of the amplitude value has succeeded. If the obtainment has not succeeded, the system controller 10 executes error processing at STEP S311. If the obtainment of the amplitude value has succeeded, the process proceeds to STEP S310. The system controller 10 sorts the spherical aberration correction values SA as SA_L, SA_M, and SA_H in the ascending order of SA, and brings the process back to STEP S108 shown in FIG. 8.

While the embodiments of the present invention have been described above, the present invention should not be limited to the described embodiments.

For example, in the embodiments, a beam expander and a liquid crystal device have been illustrated as spherical aberration correction mechanisms. However, the present invention can be preferably applied to cases where other spherical aberration correction mechanisms are employed.

In addition, in the embodiments, a case of employing a method for adjusting the spherical aberration correction value to SA_peak when a peak amplitude value of the tracking error signal TE resides within a range defined by three points (SA_L≦SA_peak≦SA_H) based on the result of the second-order approximation has been illustrated as a basic coarse adjustment operation. However, other methods can be employed as the basic coarse adjustment operation.

For example, an optimum point may be detected on the basis of the magnitude of three amplitude values of the tracking error signal TE instead of detecting the optimum point of the amplitude value of the tracking error signal TE based on the result of the second-order approximation. More specifically, the optimum point in the amplitude value of the tracking error signal TE may be detected by determining whether or not the amplitude value of the tracking error signal TE is maximized (optimized) at, for example, the spherical aberration correction value SA_M among the three spherical aberration correction values SA_L, SA_M, and SA_H. That is, if the amplitude value is optimized at the spherical aberration correction value SA_M, a point at which the slope of the amplitude value of the tracking error signal TE changes (i.e., a most suitable amplitude value of the tracking error signal TE) resides within a range defined by the three points SA_L, SA_M, and SA_H.

Even in a case such a method is employed, the spherical aberration correction value is sequentially altered in the direction that the amplitude value of the tracking error signal TE includes (in a direction the amplitude value approaching the optimum value) to detect the optimum point. Thus, every time the spherical aberration correction value is newly altered, whether or not the spherical aberration correction value to be altered is not smaller than (or is not greater than) the limit value "B" is determined. If the spherical aberration correction value is smaller than the limit value "B", the above-described operation for detecting the optimum point is performed on three points, including the newly altered point. If the spherical aberration correction value is not smaller than (or is not greater than) the limit value "B", the current spherical aberration correction value is set as the adjustment value.

In addition, if the amplitude value is optimized at the spherical aberration correction value SA_M, this value SA_M may be set as the adjustment value. Alternatively, if the amplitude value is optimized at the spherical aberration correction value SA_M, a spherical aberration correction value that optimizes the amplitude value of the tracking error signal TE is set as the adjustment value on the basis of a result of altering the spherical aberration correction value to a plurality of points by a smaller alteration step within a range between SA_L and SA_H.

In addition, in the embodiment, a case where a current spherical aberration correction value is set as the adjustment value when the spherical aberration correction value to be newly altered is not smaller than (or not greater than) the limit value "B" has been illustrated. However, the limit value "B" may be set as the adjustment value. Such a case can also offer advantages similar to those of the embodiments.

In addition, in the description given above, a case where the spherical aberration correction value is altered by a constant alteration step has been described. However, the alteration step of the spherical aberration correction value is not necessarily set constant, and may be variable.

Additionally, in the embodiments, a case where the optical recording medium driving device according to an embodiment serves as a recording/reproducing apparatus that performs recording and reproducing for optical discs (writable discs) on which data is recorded in a phase change recording method has been illustrated. However, the optical recording medium driving device according to the embodiment of the present invention can be preferably applied to a reproducing-only apparatus that performs only reproduction of data for a read-only disc on which data is recorded through combination of pits and lands, for example. Alternatively, the optical recording medium driving device according to the embodiment of the present invention can be preferably applied to a recording-only apparatus capable of only recording.

Furthermore, a case where a jitter value is employed as an evaluation value used as an evaluation indicator of the quality of a reproduced signal at the time of fine adjustment has been illustrated. Other than this value, for example, an evaluation value for difference metric (a value representing an error and a deviation from an ideal value in a case where PRML (Partial Response Maximum Likelihood) is employed in the binarization processing) can also be employed.

In either case, the evaluation value used in the fine adjustment has only to serve as the evaluation indicator of the quality of the reproduced signal, and should not be limited to the one illustrated in the embodiments.

In addition, a case where an amplitude value of a tracking error signal TE is used as a value of an evaluation signal at the time of coarse adjustment of the spherical aberration correction value has been illustrated. However, the value of the evaluation signal used in the coarse adjustment is not limited to those illustrated in the embodiments. For example, an amplitude value of an RF signal (reproduced data signal) and an amplitude value of a wobble signal (push-pull signal) can be employed. Other signal values that are generated on the basis of reflected light information and can serve as an evaluation indicator of a readout signal supplied from an optical pickup can be employed as the value of the evaluated signal.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium driving device, comprising:
    head means for irradiating a laser light onto an optical recording medium and detecting a reflected light from the optical recording medium to read out a signal, the head means having a focus servo mechanism and a spherical aberration correction mechanism for the laser light;
    evaluation signal generating means for generating, based on the reflected light detected by the head means, an evaluation signal that serves as an indicator of a quality of the readout signal;
    focus servo means for driving the focus servo mechanism according to a focus error signal generated based on the reflected light detected by the head means to perform a focus servo operation;
    spherical aberration correction means for driving the spherical aberration correction mechanism according to a spherical aberration correction value to perform a spherical aberration correction operation;
    focus bias means for adding focus bias to a focus loop including the focus servo means; and
    control means for setting a first adjustment value based on the evaluation signal obtained in response to the focus servo means altering the spherical aberration correction value, and based on a limit value set for the spherical aberration correction value value,
    wherein the control means
    obtains values of the evaluation signal in response to sequentially altering the spherical aberration correction value by a predetermined alteration value,
    determines, based on the obtained results, whether or not an optimum evaluation signal value exists within a range defined by a plurality of spherical aberration correction values including a newly altered one, and
        when the optimum evaluation signal value does not exist within the range defined by the plurality of spherical aberration correction values, further determines whether or not a spherical aberration correction value to be altered next is not smaller than the limit value, and
        when the result of this determination indicates that the spherical aberration correction value to be altered next is not smaller than the limit value, sets a spherical aberration correction value based on the limit value as the first adjustment value.

2. The device according to claim 1, wherein the control means sets the spherical aberration correction value as the first adjustment value when the spherical aberration correction value to be altered next is not smaller than the limit value.

3. The device according to claim 1, wherein the control means sets the limit value as the first adjustment value when the spherical aberration correction value to be altered next is not smaller than the limit value.

4. The device according to claim 1, further comprising:
    evaluation value calculating means for calculating, based on the signal read out by the head means from the optical recording medium, a predetermined evaluation value that serves as an indicator of a quality of a reproduced signal, wherein
    the control means, after setting the first adjustment value, further sets a second adjustment value and an adjustment value of the focus bias based on the predetermined evaluation value obtained in response to the focus servo means altering both the spherical aberration correction value and the focus bias with respect to the first adjustment value of the spherical aberration correction value and a predetermined initial value of the focus bias, respectively.

5. A spherical aberration adjustment method for an optical recording medium driving device to adjust a spherical aberration correction value, the optical recording medium driving device including head means, having a focus servo mechanism and a spherical aberration correction mechanism for a laser light, for irradiating the laser light onto an optical recording medium and for detecting a reflected light from the optical recording medium to read out a signal, evaluation signal generating means for generating, based on the reflected light detected by the head means, an evaluation signal that serves as an indicator of evaluating a quality of the readout signal, focus servo means for driving the focus servo mechanism according to a focus error signal generated based on the reflected light detected by the head means to perform a focus servo operation, spherical aberration correction means for driving the spherical aberration correction mechanism according to a spherical aberration correction value to perform a spherical aberration correction operation, and focus bias means for adding focus bias to a focus loop including the focus servo means, the method comprising:
    setting an adjustment value based on the evaluation signal obtained in response to the focus servo means altering the spherical aberration correction value, and based on a limit value set for the spherical aberration correction value,
    obtaining values of the evaluation signal in response to sequentially altering the spherical aberration correction value by a predetermined alteration value,
    determining, by a processor, based on the obtained results, whether or not an optimum evaluation signal value exists within a range defined by a plurality of spherical aberration correction values including a newly altered one, and
        when the optimum evaluation signal value does not exist within the range defined by the plurality of spherical aberration correction values, further determines whether or not a spherical aberration correction value to be altered next is not smaller than the limit value, and
        when the result of this determination indicates that the spherical aberration correction value to be altered next is not smaller than the limit value, sets a spherical aberration correction value based on the limit value as the first adjustment value.

6. An optical recording medium driving device, comprising:
    an optical head configured to irradiate a laser light onto an optical recording medium and detecting a reflected light from the optical recording medium to read out a signal, the optical head having a focus servo mechanism and a spherical aberration correction mechanism for the laser light;
    an evaluation signal generating section configured to generate, based on the reflected light detected by the optical head, an evaluation signal that serves as an indicator of a quality of the readout signal;
    a focus servo section configured to drive the focus servo mechanism according to a focus error signal generated by a matrix circuit based on the reflected light detected by the optical head to perform a focus servo operation;

a spherical aberration correction section configured to drive the spherical aberration correction mechanism according to a spherical aberration correction value to perform a spherical aberration correction operation;

a focus bias adjuster configured to add focus bias to a focus loop including the focus servo section; and a system controller, including a processor, configured to set the adjustment value of the spherical aberration correction value based on the evaluation signal obtained in response to the focus servo section altering the spherical aberration correction value, and based on a limit value set for the spherical aberration correction value, wherein the system controller obtains values of the evaluation signal in response to sequentially altering the spherical aberration correction value by a predetermined alteration value, determines, based on the obtained results, whether or not an optimum evaluation signal value exists within a range defined by a plurality of spherical aberration correction values including a newly altered one, and when the optimum evaluation signal value does not exist within the range defined by the plurality of spherical aberration correction values, further determines whether or not a spherical aberration correction value to be altered next is not smaller than the limit value, and when the result of this determination indicates that the spherical aberration correction value to be altered next is not smaller than the limit value, sets a spherical aberration correction value based on the limit value as the first adjustment value.

* * * * *